(12) United States Patent
Chihara

(10) Patent No.: US 6,678,462 B1
(45) Date of Patent: Jan. 13, 2004

(54) ELECTRONIC DEVICE, METHOD AND APPARATUS FOR CONTROLLING AN ELECTRONIC DEVICE, AND ELECTRONIC DEVICE CONTROL SYSTEM

(75) Inventor: Shuichi Chihara, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/047,600

(22) Filed: Mar. 25, 1998

(30) Foreign Application Priority Data

Mar. 25, 1997 (JP) .......................... P09-071469
Mar. 25, 1997 (JP) .......................... P09-071470

(51) Int. Cl.[7] .................................. H04N 5/91
(52) U.S. Cl. .................... 386/83; 386/46; 386/125; 725/50
(58) Field of Search .......................... 386/1, 40, 46, 386/52, 83, 81, 94, 95, 113, 124, 125; 348/222, 231–233, 12, 906; 709/234, 217, 219; 711/114; 710/52, 56, 57; 369/84, 30.64; 725/50, 89, 134, 142; 370/508; 250/252.1

(56) References Cited

U.S. PATENT DOCUMENTS

| | | | |
|---|---|---|---|
| 5,418,763 A | * 5/1995 | Ichikawa et al. | 369/30.64 |
| 5,576,844 A | * 11/1996 | Anderson et al. | 386/52 |
| 5,648,816 A | * 7/1997 | Wakui | 348/233 |
| 5,883,901 A | * 3/1999 | Chiu et al. | 370/508 |
| 5,911,779 A | * 6/1999 | Stallmo et al. | 711/114 |
| 5,956,455 A | * 9/1999 | Hennig | 386/83 |
| 6,064,378 A | * 5/2000 | Chaney et al. | 348/906 |
| 6,091,886 A | * 7/2000 | Abecassis | 386/83 |
| 6,324,334 B1 | * 11/2001 | Morioka et al. | 386/52 |
| 6,541,763 B2 | * 4/2003 | Lingren et al. | 250/252.1 |

* cited by examiner

Primary Examiner—Thai Tran
Assistant Examiner—Christopher Onuaku
(74) Attorney, Agent, or Firm—Lerner, David, Littenberg, Krumholz & Mentlik, LLP

(57) ABSTRACT

When a video tape recorder or the like is programmed to record a desired TV program, the programming information is stored in a programming memory. If the remaining storage capacity of the programming memory becomes insufficient to store all programming information, a part of the programming information is transferred to a server via a telephone line and is stored in the program information database of the server. When the video tape recorder has completed a recording operation of a certain TV program, the programming information is sent back from the program information database of the server to the programming memory of the video tape recorder and is stored therein.

24 Claims, 22 Drawing Sheets

FIG. 8

```
< HTML >
< HEAD >
< TITLE >
data_970101_001_swiss. mpg
< /TITLE >
< /HEAD >
< BODY >
< a  href="http: / /VTR1/data_970101_001_swiss. mpg" >
        data_970101_001_swiss. mpg
< /a >
< /BODY >
< /HTML >
```

FIG. 9

Switzerland.jpg

Arabia.avi

Alps.mid

China.tif

Thai.mpg

France.txt

FIG. 10

```
< HTML >
< TITLE >
Data of January 1, 1997
< /TITLE >

< BODY BGCOLOR="#FFFFFF" >
< H3 > Data stored on January 1, 1997 < /H3 >
< HR >
< P >

< A HREF="http: / /vtr1/1997_0101_01_switzerland. jpg" >Switzerland. jpg< /A > < P >

< A HREF="http: / /vtr1/1997_0101_02_arabia. avi" >Arabia. avi< /A > < P >

< A HREF="http: / /mdl/1997_0101_03_alps. mid" >Alps. mid< /A > < P >

< A HREF="http: / /vtr2/1997_0101_04_china. tif" >China. tif< /A > < P >

< A HREF="http: / /dvd1/1997_0101_05_thai. mpg" >Thai. mpg< /A > < P >

< A HREF="http: / /cas2/1997_0101_06_france. txt" >France. txt< /A > < P >

HR >
< /BODY >
< /HTML >
```

FIG. 19

TRAVEL INFORMATION

| TRAVEL IN EUROPE | TWO-WEEK TRAVEL ON TRAINS IN EUROPE |
| MYSTERY OF THE PYRAMIDS | WHO BUILT THE PYRAMIDS AND WHEN? |
| TRAVEL IN ASIA | TRAVEL TO ENJOY EXOTIC AND MYSTERIOUS FOODS IN ASIA |
| TRAVEL IN INDIA | TRAVEL FROM SOUTH TO NORTH THROUGH MANY REMAINS |
| HISTORICAL HERITAGE OVER THE WORLD | A LOT OF HERITAGE IN HUMAN HISTORY |
| BARGAIN-PRICED AIRLINE TICKETS | THE BEST WAY OF GETTING BARGAIN-PRICED AIRLINE TICKETS |

FIG. 20

1234567890. 19970101120013000105, Historical Heritage Over The World

Travel: overseas: history, Travel through a lot of remains over the world to find the heritage built through the long history of humans 1234567890: Program ID
19970101120013000105 : start at 12. January 1. 1997, end at 13
            channel 1, in the same time zone every week Note: Two digits on the extremely right side represent:
    01: in the same time zone every day
    05: the same time zone on the same day of every week
    06: every two weeks
    07: only once Historical heritage over the world : title of the program
                  Category data : travel, overseas, history
        Abstract of the program : travel through a lot of remains over the world to find the heritage built through the long history of humans

FIG. 23

CONFIRMATION OF PROGRAMMING

| MYSTERY OF THE PYRAMIDS | WHEN BUILT THE PYRAMIDS AND WHEN? |
| --- | --- |
| INTERNATIONAL MARATHON RACE | ENJOY PREOLYMPIC GAME |
| ON-LINE ECONOMICS | HIGH-TECH COMPANIES PROMISSING IN THE STOCK MARKET |

PLEASE REPLACE THE TAPE TO RECORD THE FOLLOWING PROGRAM(S):

| SITES OF MAPLE | VISIBLE INFORMATON ABOUT BEAUTIFUL-COLORED MAPLE, OVER THE WHOLE COUNTRY |
| --- | --- |
| WEEKLY WEATHER FORECAST | CHECK THE WEATHER OF CONSECTIVE THREE HOLIDAYS AT THE END OF THIS WEEK |

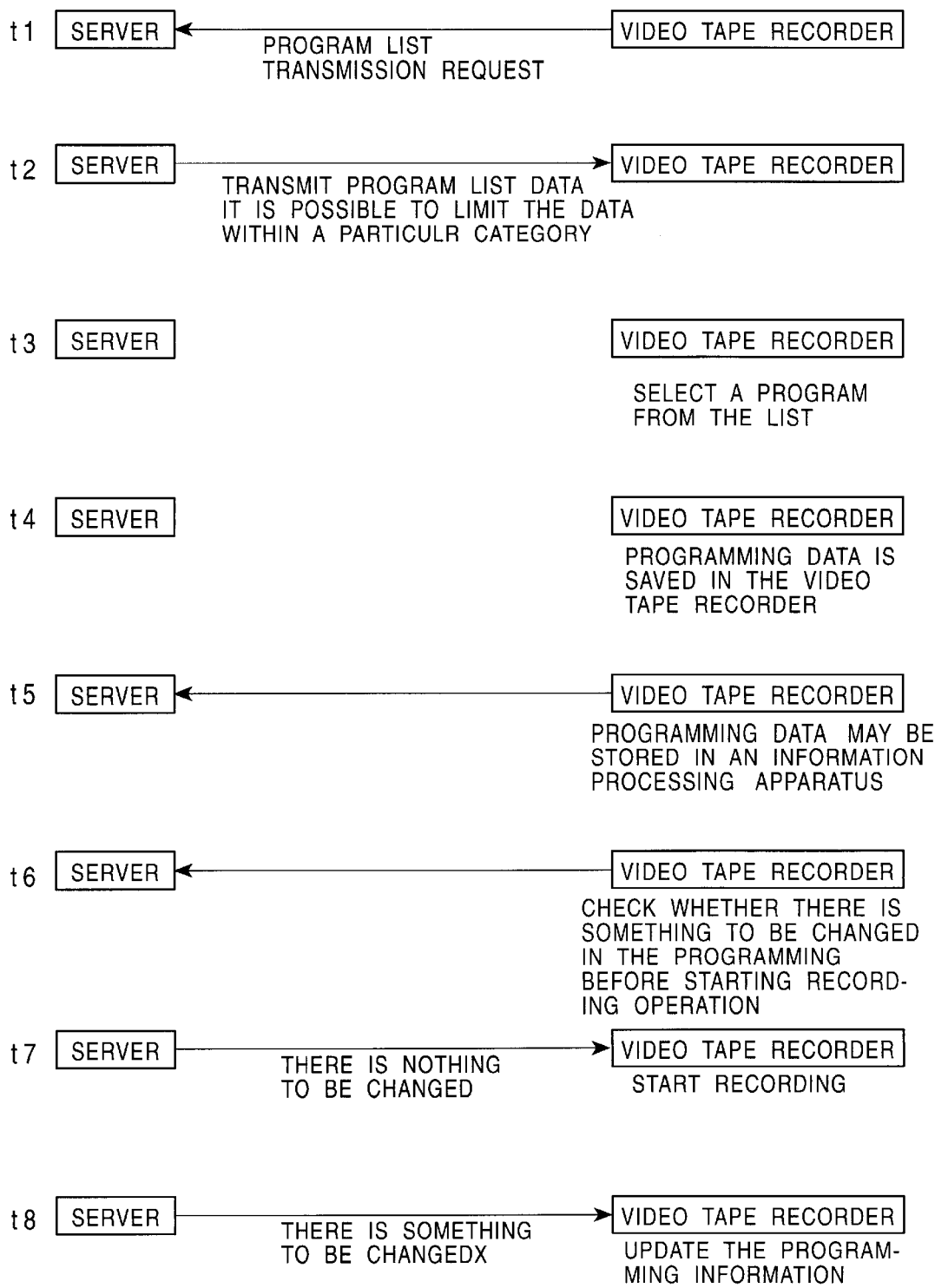

ELECTRONIC DEVICE, METHOD AND APPARATUS FOR CONTROLLING AN ELECTRONIC DEVICE, AND ELECTRONIC DEVICE CONTROL SYSTEM

BACKGROUND OF THE INVENTION

1. Field of the Invention

The present invention relates to an improved technique of setting an electronic device to be programmed to record a desired TV program.

2. Description of the Related Art

Video tape recorders have the capability of being programmed to record TV programs. In general, the programming of the operation for recording TV programs is performed by a user in such a way that the user selects a desired TV program from a TV program list provided by a newspaper or the like and inputs programming information such as the data, time, etc., corresponding to the desired TV program through a remote commander or the like.

Through the above programming process, the programming information is stored in the memory provided in a video tape recorder. When the starting time of that TV program comes, the video tape recorder turns on electric power by itself so that the desired channel is received and recorded.

As a result of the recent advancement in the digital TV broadcasting technology, it becomes possible for a user to receive as many as 100 or more channels. However, the increase in the number of channels has made it difficult for the user to select a desired TV program. One known technique to solve the above problem is to transmit information (electrical program guide or EPG for short) required for the user to select a desired TV program from an information supplier to the user so that the user can select a desired TV program with assistance of the EPG.

The EPG is also used by the user to set his/her video cassette tape recorder so that it is programmed to record a desired TV program.

However, in the conventional technique described above, if the broadcasting time is changed after the user has set his/her video cassette tape recorder using the EPG, the recording operation starts at an incorrect time and thus the desired TV program cannot be recorded.

Thus, it is an object of the present invention to provide a highly reliable technique of recording a desired TV program without encountering incorrect recording even if the broadcast schedule is changed.

SUMMARY OF THE INVENTION

According to an aspect of the present invention, there is provided an electronic device comprising: storage means for storing control information; processing means for performing a predetermined process in accordance with the control information stored in the storage means; judgement means for judging the storage capacity of the storage means; and transfer means for transferring the control information to an external device so as to store the control information therein, depending on the result of the judgement made by the judgement means.

According to another aspect of the present invention, there is provided a control apparatus for controlling an electronic device, the controlling apparatus comprising: reception means for receiving control information transmitted from an electronic device; storage means for storing the control information received via the reception means; and transmission means for, in response to a request from the electronic device, transmitting the control information stored in the storage means to the electronic device.

According to still another aspect of the present invention, there is provided an electronic device control system including an electronic device and an information processing apparatus, the electronic device comprising: first storage means for storing control information; processing means for performing a predetermined process in accordance with the control information stored in the first storage means; judgement means for judging the storage capacity of the first storage means; and transfer means for transferring the control information to the information processing apparatus so as to store the control information therein, depending on the result of the judgement made by the judgement means; the information processing apparatus comprising: reception means for receiving control information transmitted from the electronic device; second storage means for storing the control information received via the reception means; and transmission means for, in response to a request from the electronic device, transmitting the control information stored in the second storage means to the electronic device.

According to still another aspect of the present invention, there is provided an electronic device comprising: reception means for receiving selection information from an external device, the selection information being used to select desired information from a plurality of pieces of information; storage means for storing a first time corresponding to the selection information received via the reception means; detection means for detecting a second time which is earlier by a predetermined length of time than the first time stored in the storage means; confirmation means for making a confirmation by asking the external device whether there is no change in the selection information when the detection means detects the arrival of the second time; and updating means for updating the selection information stored in the storage means when the confirmation means detects a change in the selection information.

According to still another aspect of the present invention, there is provided an information supplying apparatus comprising: storage means for storing selection information used to select desired information from a plurality of pieces of information; updating means for updating the selection information stored in the storage means when the selection information is changed; and transmission means for transmitting the selection information updated by the updating means in response to a request received from an external apparatus.

According to still another aspect of the present invention, there is provided an information supplying system comprising an electronic device and an information supplying apparatus, the electronic device comprising: reception means for receiving control information from the information supplying apparatus, the control information being used to select desired information from a plurality of pieces of information; first storage means for storing a first time corresponding to the selection information received via the reception means; detection means for detecting a second time which is earlier by a predetermined length of time than the first time stored in the first storage means; confirmation means for making a confirmation by asking the information supplying apparatus whether there is no change in said selection information when the detection means detects the arrival of the second time; and first updating means for updating the selection information stored in the first storage means when the confirmation means detects a change in the selection information, the information supplying apparatus comprising: second storage means for storing the selection information, second updating means for updating the selection information stored in the second storage means when the selection information is changed; and transmission means for transmitting the selection information updated by the second updating means in response to a request received from the electronic device.

In the electronic device and the method of controlling the electronic device according to the present invention, as described above, control information is transferred to an external device depending on the result of the judgement on the storage capacity of the storage means in which the control information is stored so that a great amount of control information can be stored at any time thereby ensuring that a desired control operation can be programmed.

Furthermore, in the apparatus and method for controlling an electronic device, control information transferred from the electronic device is stored, and the control information stored is sent back to the electronic device in response to a request from the electronic device. This makes it possible to ease the requirement associated with the storage capacity of the electronic device.

Furthermore, in the system of controlling an electronic device and the method of controlling the electronic device in the system, the electronic device evaluates the storage capacity of storage means used to store control information, and the control information is transferred to an information processing apparatus depending on the result of the evaluation, wherein the information processing apparatus stores the control information received from the electronic device so that the control information can be transmitted back to the electronic device in response to a request from the electronic device. This makes it possible to realize a system capable of storing a greater amount of control information without having to increase the storage capacity of the electronic device.

Furthermore, in the electronic device and the method of controlling the electronic device according to the present invention, as described above, when the second time has come, it is confirmed whether there is no change in the selection information. If there is a change in the selection information, the selection information stored is updated thereby ensuring that desired information can be received even if the transmission starting time of that information is changed.

In the information supplying apparatus and the method of supplying information according to the present invention, as described above, when the selection information is changed, the selection information is updated, and the updated selection information is transmitted to an external device in response to a request from the external device thereby ensuring that the external device can select desired selection information.

In the information supplying system and the method of supplying information according to the present invention, when the second time has come, the electronic device makes a confirmation by asking the information supplying apparatus whether there is no change in the selection information. In the case where there is a change in the selection information, the information supplying apparatus transmits the updated selection information to the electronic device. The electronic device stores the updated selection information received. Thus, in this system and method, the electronic device can select desired information even if there is a change in the selection information.

BRIEF DESCRIPTION OF THE DRAWING

FIG. 8 illustrates an example of an HTML data;

FIG. 9 illustrates an example of data to be recorded;

FIG. 10 illustrates an example of HTML data representing the information to be recorded;

FIG. 19 illustrates an example of an electric program guide displayed on the screen of a display;

FIG. 20 illustrates an example of programming information;

FIG. 23 is an example of information displayed on the screen for confirmation of the programming;

FIG. 26 is a timing chart associated with the operation of setting the video tape recorder to be programmed to record a desired TV program.

DESCRIPTION OF THE PREFERRED EMBODIMENTS

Figure 1:
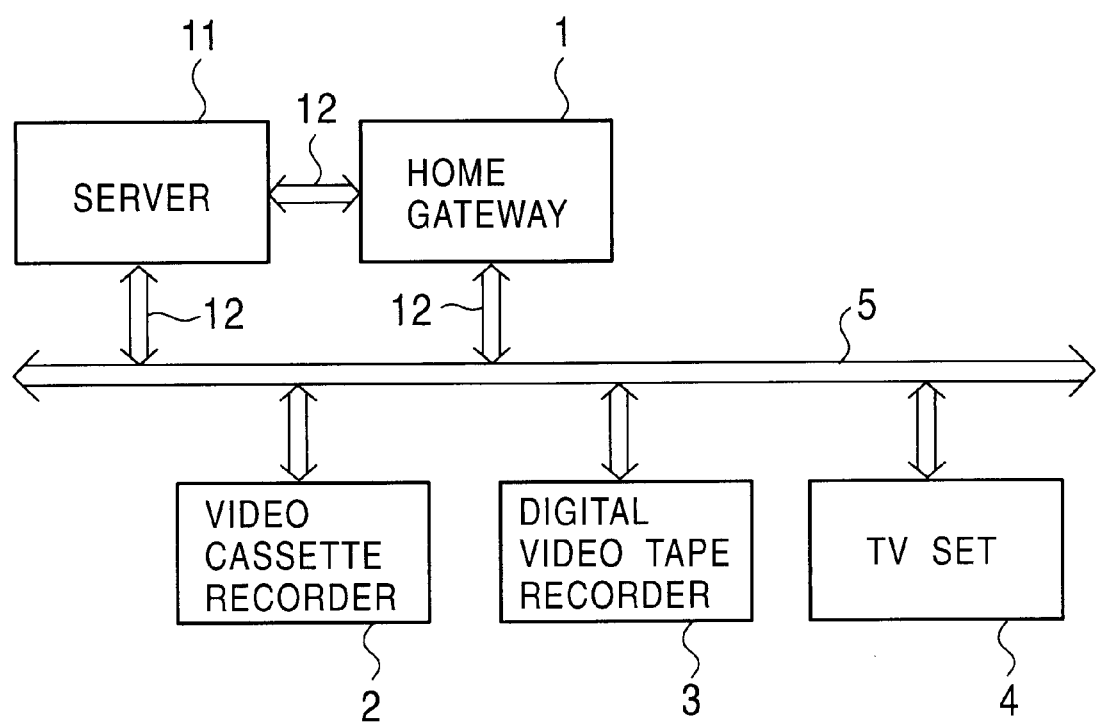
FIG. 1 is a block diagram illustrating an example of an electronic device control system according to the present invention.

FIG. 1 illustrates an example of an electronic device control system according to the present invention. Herein, the term "system" is used to describe the whole of a set of a plurality of devices.

In this electronic device control system, a server 11 is connected to electronic devices located in respective homes through a telephone line 12 serving as a communication line. In this example, electronic devices such as an analog video tape recorder 2, a digital video tape recorder 3, a television set 4 and a home gateway 1 are connected to each other through a home bus 5.

The home gateway 1 is responsible for properly controlling the analog video tape recorder 2; the digital video tape recorder 3, and the television set 4 through the home bus 5.

Figure 2:
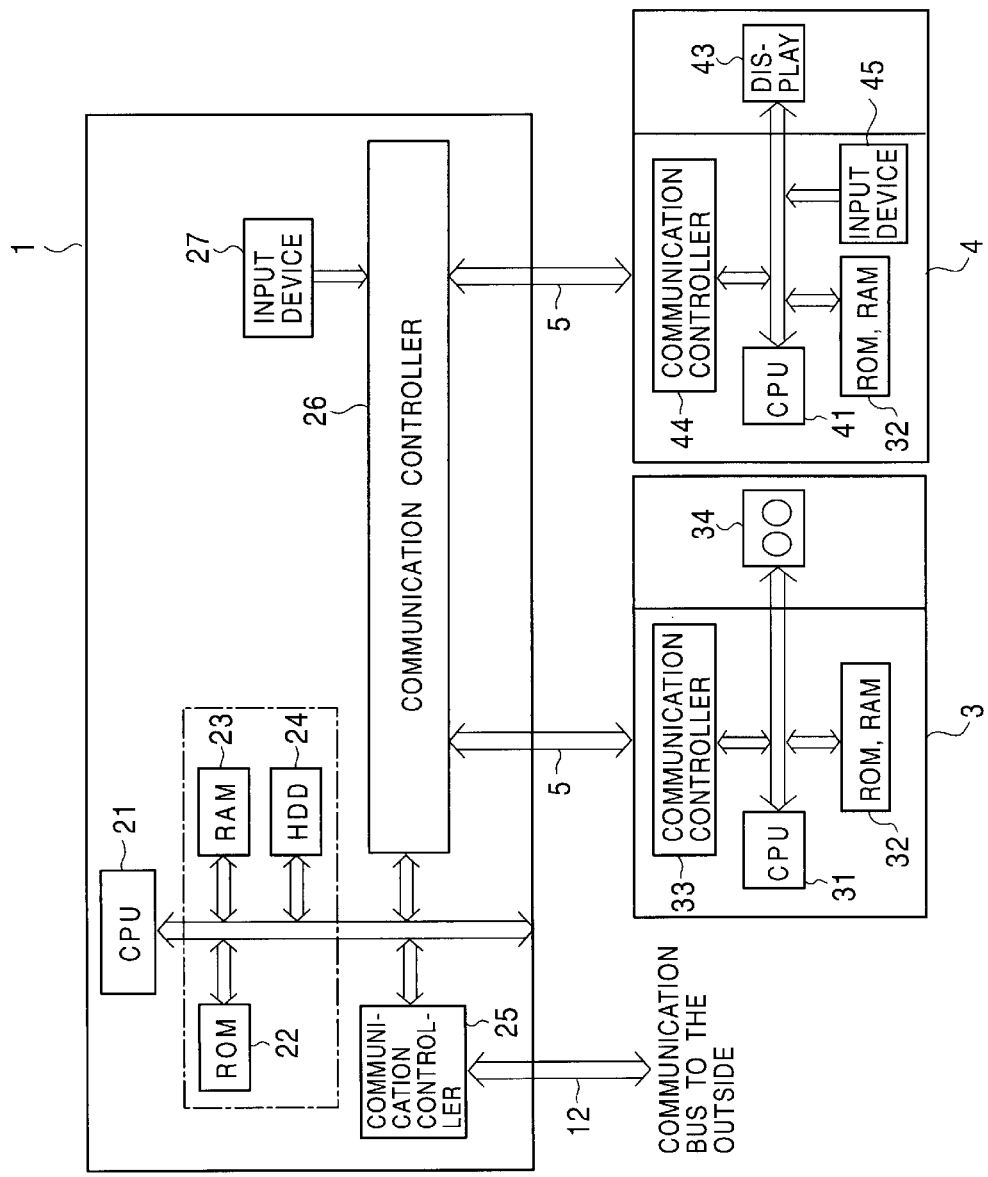
FIG. 2 is a block diagram illustrating an example of the internal construction of the home gateway, the digital video tape recorder, and the television set shown in FIG.

FIG. 2 illustrates the details of the home gateway (HGW) 1, the digital video tape recorder 3 and the television set 4. The home gateway 1 has a CPU 21 which executes various processes according to the program stored in a ROM 22. A RAM 23 is used to store data required for the CPU 21 to execute various processes. A hard disk drive (HDD) 24 is controlled by the CPU 21 and is used by the CPU 21 to store various data.

The communication controller 25 communicates with the server 11 or other external devices through the telephone line 12. The communication controller 26 also communicates with the digital video tape recorder 3, the television set 4, and other devices through the home bus 5. The input device 27 is used by a user to input various commands.

The digital video tape recorder 3 has a memory 32 including a ROM and a RAM. The CPU 31 executes various processes according to the program stored in the ROM of the memory 32, wherein data required in the processes is stored in the RAM of the memory 32. The communication controller 33 communicates with the home gateway 1 and the television set 4 through the home bus 5. The data recording/reproducing unit 34 records and reproduces video data onto and from a cassette tape loaded on the video tape recorder 3.

The television set 4 has a CPU 41 for executing various processes according to a program stored in a ROM of a memory 42. Data required for the CPU 41 to execute various processes and other data are stored in a RAM of the memory 42. The display device 43 made up of an LCD or a CRT and is used to display an image. The communication controller 44 communicates with the home gateway 1, the digital video tape recorder 3 and other devices through the home bus 5. The input device 45 is used by the user to input various commands.

In this system, when a video tape loaded on the digital video tape recorder 3 is insufficient in length to record all data, the data to be recorded can be transferred to another electronic device via the home gateway 1 so that the data is stored on that device. If the home gateway 1 receives such a request, the home gateway 1 determines whether the data transferred from the digital video tape recorder can be recorded on that device. If the conclusion is positive, then the home gateway 1 transfers the data to the device, and thus the data is recorded thereon.

Figure 3:
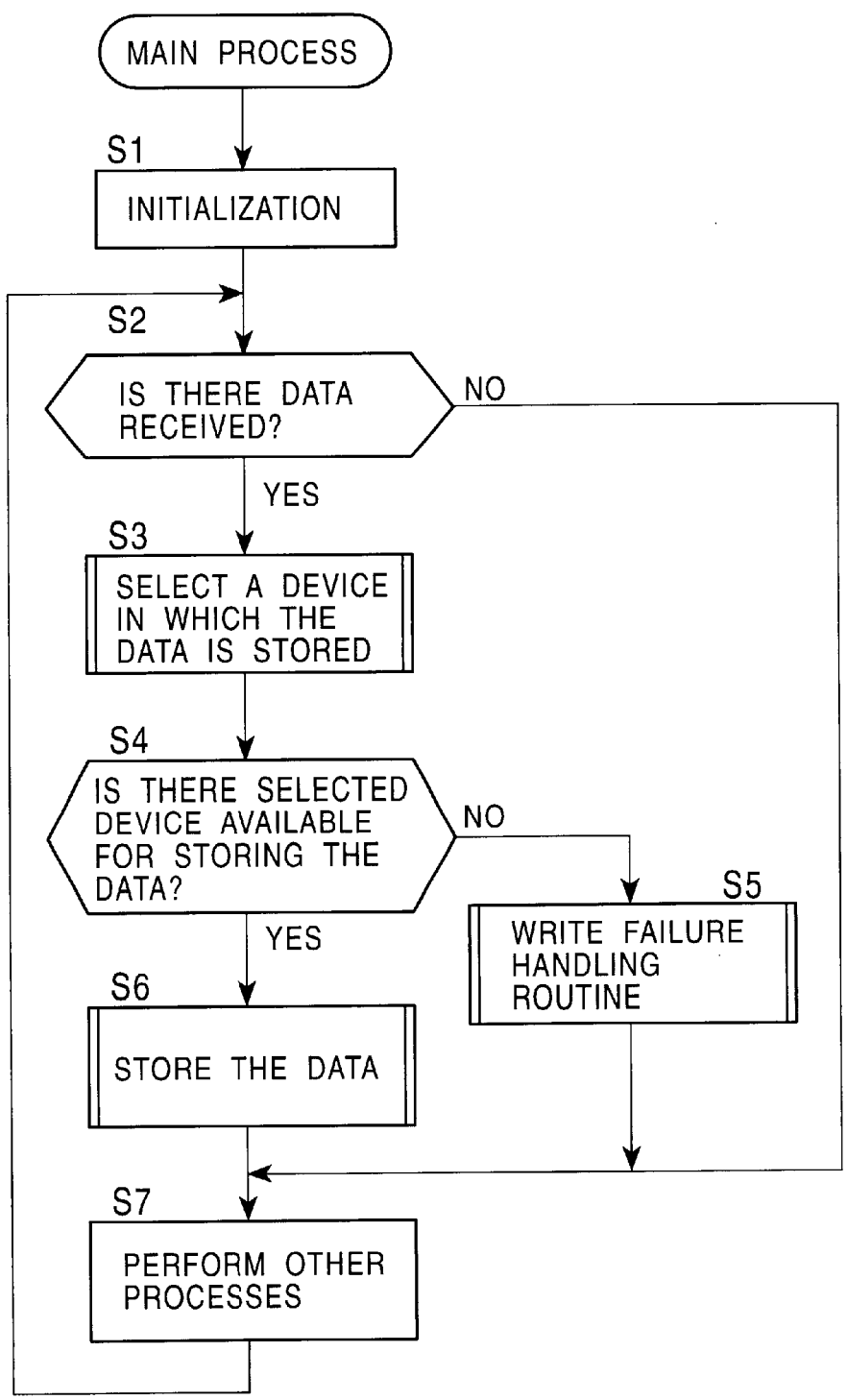
FIG. 3 is a flow chart illustrating the operation of the home gateway shown in FIG. 2.

The process performed by the home gateway 1 in such a case is shown in the flow chart of FIG. 3. At the first step S1, the CPU 21 of the home gateway 1 performs a process associated with initialization. Then in step S2, the CPU 21 determines whether there is data received from the communication controller 26 via the home bus 5. If there is no data received, then the operation goes to step S7 so as to perform other processes.

On the other hand, if it is determined in step S2 that there is data received, then the CPU 21 temporarily stores the data on the HDD 24. Then in step S3, the CPU 21 executes a routine for selecting a device in which the received data is recorded. The routine for selecting the device is described in detail in the flow chart of FIG. 4.

At step S11 in this routine, the CPU 21 examines the types of electronic devices connected to the home gateway 1 via the home bus 5 and also determines the number thereof. Then in step S12, the CPU 21 determines which electronic devices are available now for recording the data. Furthermore, in step S13, the CPU 21 determines the size of the data (file) to be recorded. In step S14, the CPU 21 selects an electronic device capable of recording the file (data) having that size.

Then the routine goes to step S15 in which it is determined whether the selected electronic device has enough recording capacity. If the remaining recording capacity is not enough, then the routine goes to step S16 and the CPU 21 determines whether there is another electronic device which has not yet been checked. If there is such an electronic device, the routine goes to step S17 to select that electronic device. Then the routine returns to step S15 to check the recording capacity of that electronic device.

If it is determined after checking all electronic devices that there is no electronic device having enough recording capacity, then the routine goes to step S18 from step S16, and the CPU 21 concludes that the recording is impossible.

On the other hand, if it is determined in step S15 that there is an electronic device having an enough recording capacity, then the routine goes to step S19 and the CPU 21 determines whether it is possible to write the data on the selected electronic device. If it is impossible to write the data on that electronic device, the routine goes to step S16 to select another electronic device in the same manner as described above.

If it is determined in step S19 that the selected electronic device is capable of writing the data, then the routine goes to step S20 in which a conclusion is made that it is possible to record the data.

Figure 4:
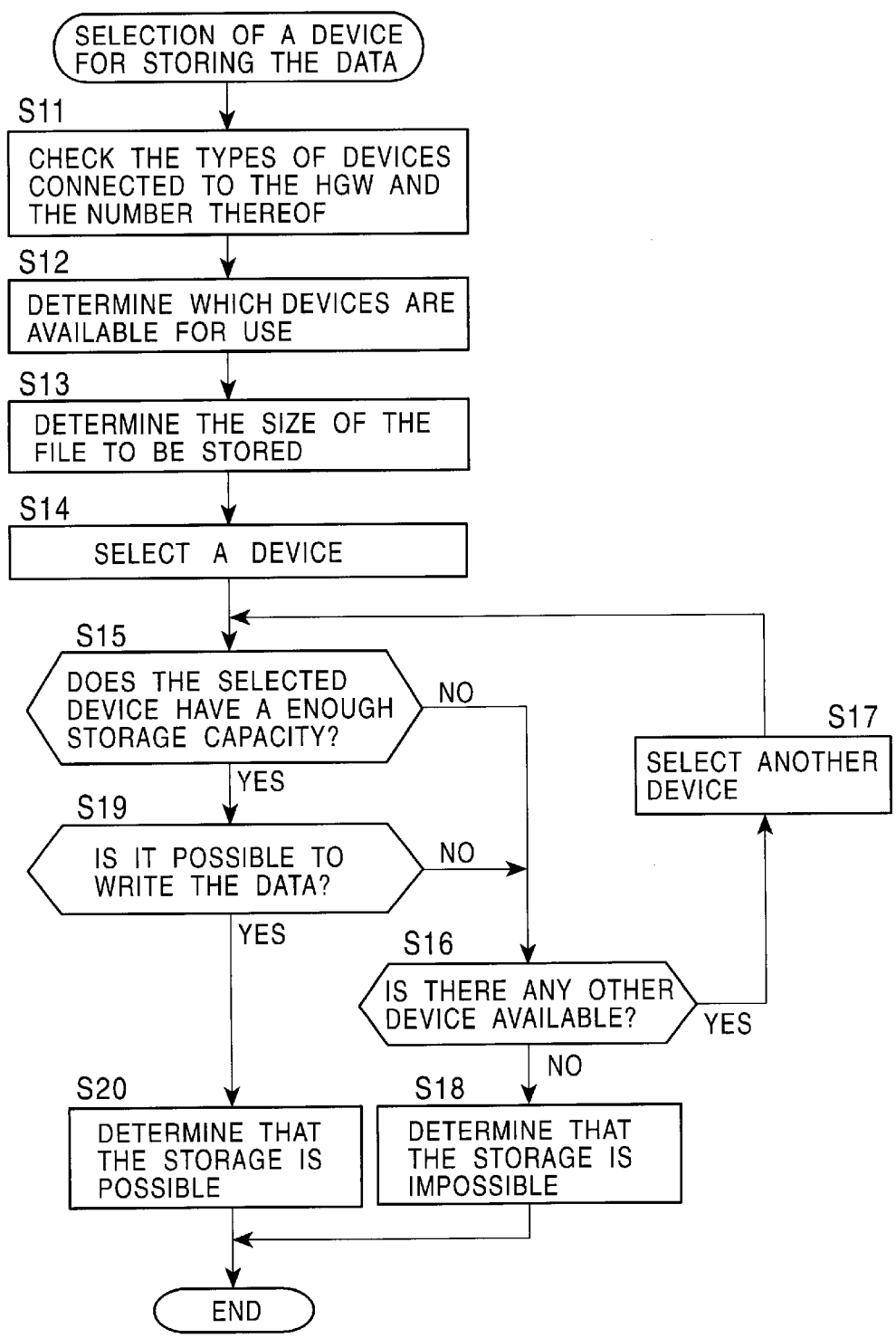
FIG. 4 is a flow chart illustrating the details of the process, performed at step S2 in FIG. 3, to select a device where data is recorded.
Figure 5:
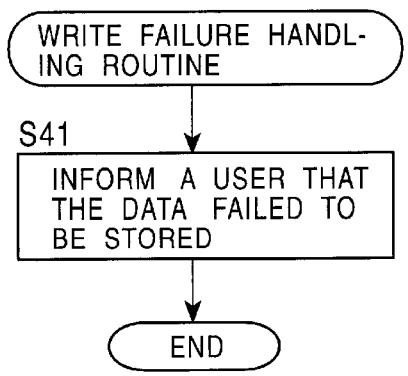
FIG. 5 is a flow chart illustrating the details of the write failure handling routine performed at step S5 in FIG. 3.

After completion of the data recording device selection routine, the main routine goes to step S4 from S3 so as to determine whether it is possible to record the data, in accordance with the determination result in step S18 or S20 in FIG. 4. If it is determined in step S4 that it is impossible to record the data, then the main routine goes to step S5 to execute a record failure handling routine. The record failure handling routine is described below with reference to FIG. 5.

At step S41 in the record failure handling routine, the CPU 21 generates a message telling that the transferred data could not be recorded, and transmits it from the communication controller 26 to the television set 4 via the home bus 5. If the CPU 41 of the television set 4 receives this message via the communication controller 44, the CPU 41 transfers the message to the display 43, which in turn displays it on its screen.

Alternatively, the home gateway 1 may temporarily store the received data on the hard disk driver 24 and transfer the data when an electric device becomes available for recording it.

Figure 6:
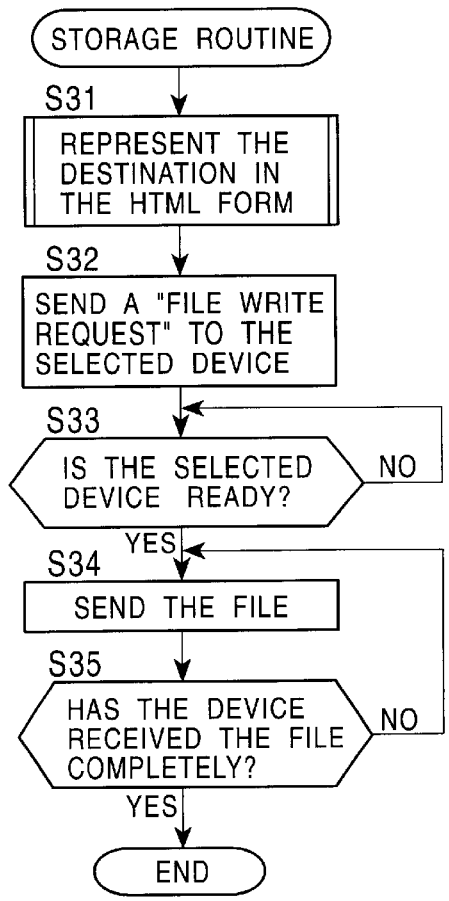
FIG. 6 is a flow chart illustrating the details of the recording routine at step S6 in FIG. 3.

On the other hand, if it is determined in step S4 in FIG. 3 that the data can be recorded, then the routine goes to step S6 to execute a recording routine as described in detail in the flow chart of FIG. 6.

At step S31 of the recording routine, the CPU 21 represents the destination where the data is to be recorded in the form of HTML (hyper text markup language). The routine of representing the destination in HTML is described in detail in the flow chart shown in FIG. 7.

Figure 7:
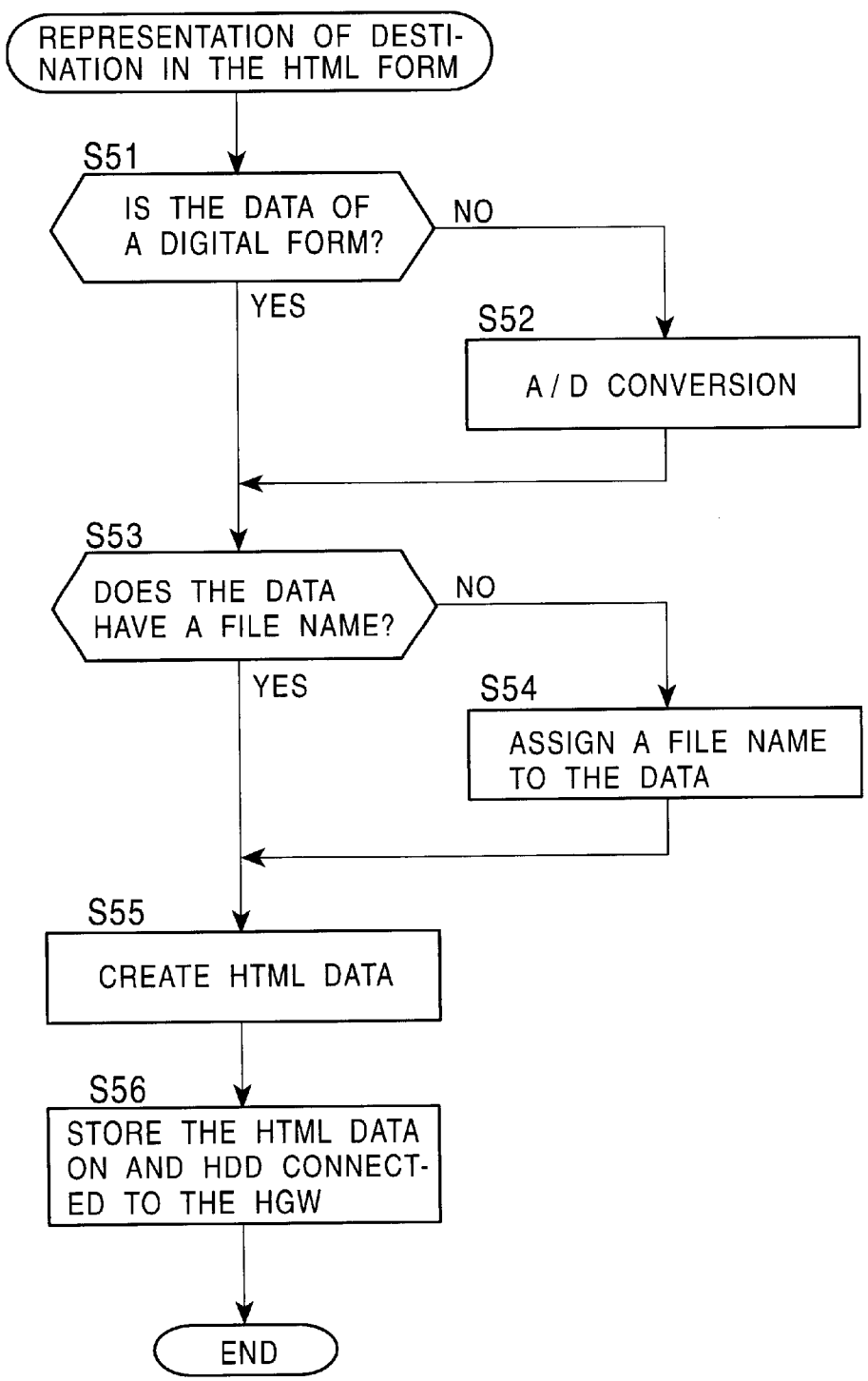
FIG. 7 is a flow chart illustrating the details of the process of representing the destination where the data is to be stored into the HTML form, performed at step S31 in FIG. 6.

That is, at step S51 in FIG. 7, the CPU 21 determines whether the data to be recorded is of a digital signal or not. If the data is not of a digital form, then the routine goes to step S52 in which the data is subjected to A/D conversion and thus is converted from the analog form into the digital form. On the other hand, when the data is of a digital form, step S52 is skipped.

Then in step S53, the CPU 21 determines whether the data to be recorded has a file name or not. If the data has no file name, then the routine goes to step S54 and executes a file name assignment process in which a file name is given by a user through the input device 27 of the home gateway 1. In the case where the data already has a file name, step S54 is skipped.

Then in step S55, the CPU 21 generates HTML data. The HTML data is stored on the HDD 24 in the next step S56.

FIG. 8 illustrates an example of HTML data generated by the CPU 21 in step S55. In this example, the HTML data indicates that a file "swiss.mpg" transferred from for example the digital video tape recorder 3 should be recorded on the VTR 1 (the analog video tape recorder 2 shown in FIG. 1). In this HTML data, "data_970101-001_swiss.mpg" represents the title of the file, and "http://VTR1" represents the destination where the file is to be recorded.

In the case where there are files, such as those shown in FIG. 9, recorded on some electronic devices connected to the home bus 5, a possible example of HTML data stored on the HHD 24 is shown in FIG. 10.

Referring again to FIG. 6, after completion of the step S31 of representing the data destination in the HTML form, the routine goes to step S32 in which the CPU 21 of the home gateway 1 transmits a file record request to the selected electronic device where the data is to be recorded. When the analog vide tape recorder 2 is selected as the data destination, the file record request is transmitted to it from the communication controller 26 via the home bus 5.

If the analog video tape recorder 2 receives the file record request, the analog video tape recorder 2 makes preparations for recording the data. When the preparations have been made, the analog video tape recorder 2 informs the home gateway 1 that the analog video tape record 2 has become ready. In the above process, the CPU 21 of the home gateway 1 waits in step S33 for the arrival of the record-ready message from the electronic device selected as the data destination. When the record-ready message is received, the routine goes to step S34 and the file is transmitted to the electronic device selected as the destination. That is, the CPU 21 controls the communication controller 26 so that the data received from the digital video tape recorder 3 is transferred to the analog video tape recorder 2 via the home bus 5. When the transferred data has been recorded completely, the analog video tape recorder -2 informs the home gateway 1 of the completion of recording the data. In the above process, the CPU 21 of the home gateway 1 waits in step S35 for the reception of the record completion message from the analog video tape recorder 2. When the record completion message is received, the data record routine is completed.

As described above, the respective electronic devices perform various processes in response to commands from the home gateway 1. For example, if the digital video tape recorder 3 receives a file read command from the home gateway 1, the digital video tape recorder 3 performs the process shown in FIG. 11 or the process shown in FIG. 12.

Figure 11:
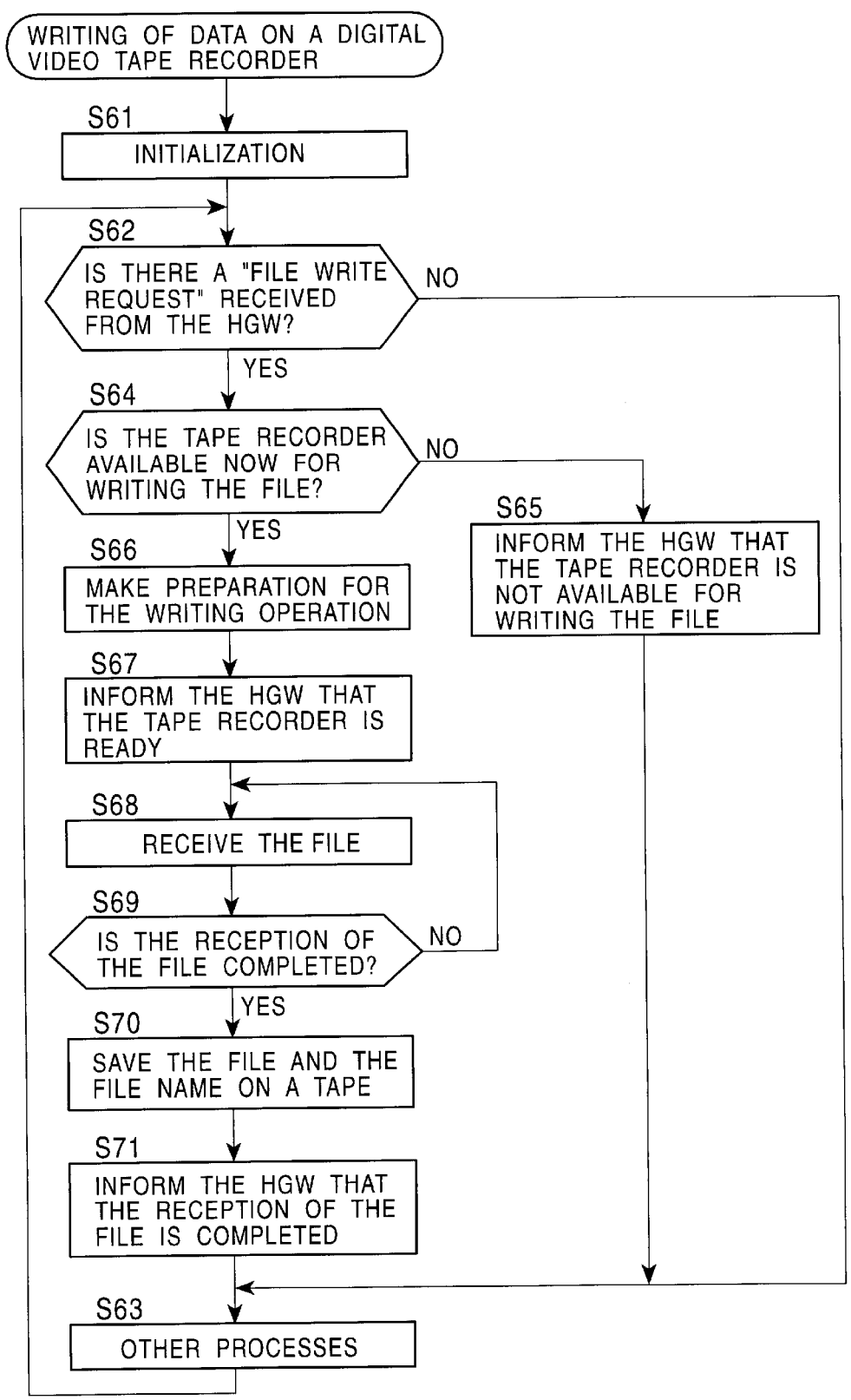
FIG. 11 is a flow chart illustrating the operation performed in a digital video tape recorder to record data.

That is, at the first step S61 in the file record process shown in FIG. 11, the CPU 31 of the digital video tape recorder 3 performs initialization. Then in step S62, the CPU 31 determines whether there is a file write command received from the home gateway 1. If there is no such a command, then the routine goes to step S63 to perform other processes.

In the case where it is determined in step S62 that there is a file record command received from the home gateway 1, the routine goes to step S64 in which the CPU 31 determines whether the digital video tape recorder 3 is now available for recording the file. If it is not available for recording the file, then the routine goes to step S65, and the CPU 31 transmits a message to the home gateway 1 through the communication controller 33 to tell that the digital tape recorder 3 is not available for recording the file.

If it is determined in step S64 that the digital video tape recorder 3 is available for recording the file, then the routine goes to step S66 in which the data recording/reproducing unit 34 makes preparations for recording the file under the control of the CPU 31. Then in step S67, the CPU 31 informs the home gateway 1 that the digital video tape recorder 3 has become ready.

If the home gateway 1 receives the record-ready message, the CPU 21 of the home gateway 2 transmits, in step S34 in FIG. 6, the file to the digital video tape recorder 3. In response, the CPU 31 of the digital video tape recorder 3 receives the file in step S68.

Then in step S69, it is determined whether the file receiving process is completed. If the file receiving process is not completed yet, the routine returns to step S68 to continue the file receiving process.

If it is determined in step S69 that the file receiving process has been completed, the routine goes to step S70. In step S70, the data recording/reproducing unit 34 records the file and its file name on a cassette tape loaded on the data recording/reproducing unit 34. If the data recording process is completed, the CPU 31 informs, in step S71, the home gateway 1 of the completion of the data recording process. In step S63 following that, the CPU 31 performs other processes.

Figure 12:
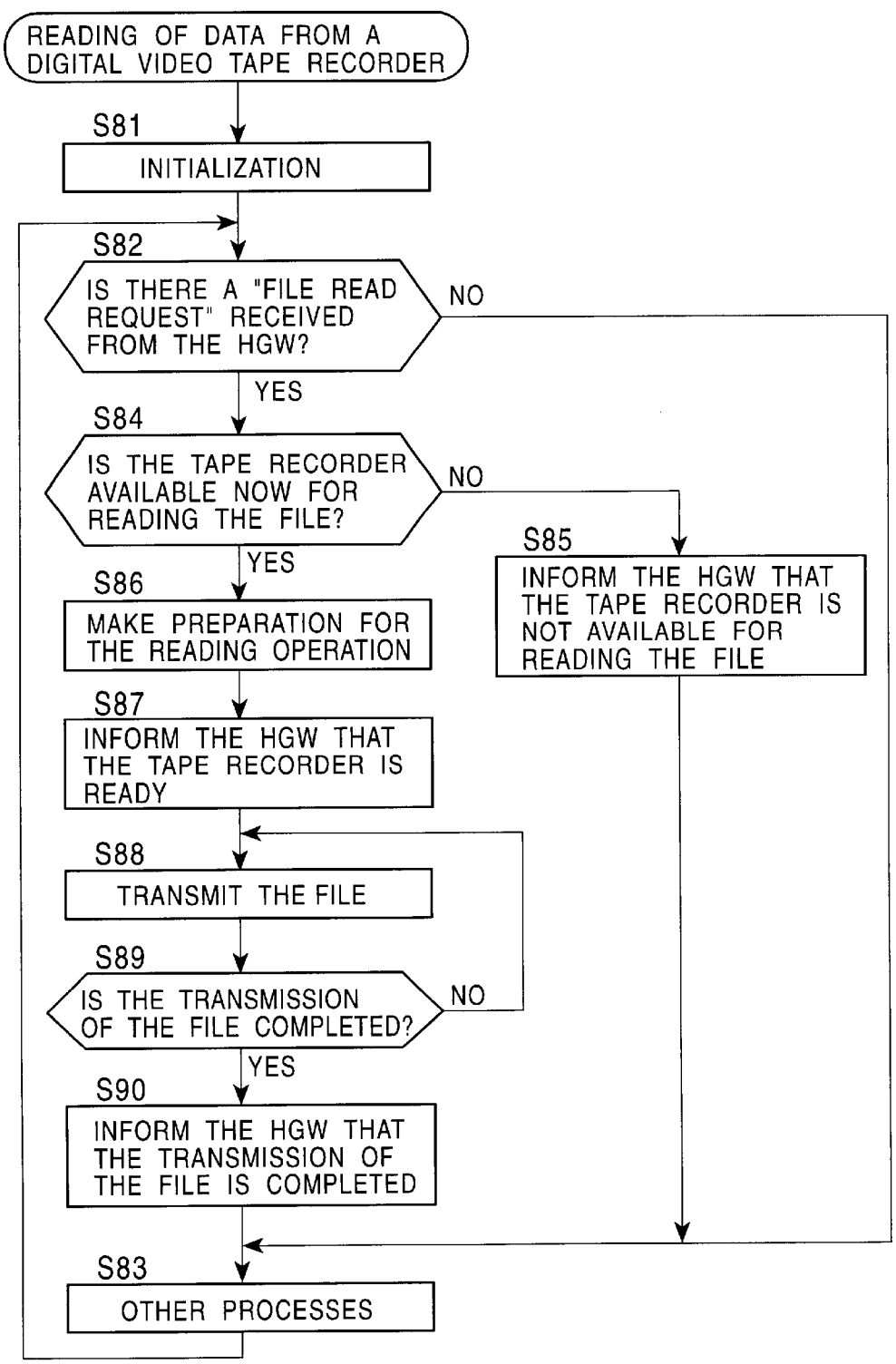
FIG. 12 is a flow chart illustrating the operation performed in the digital video tape recorder to read data.

On the other hand, in the case where a file read command is issued by the home gateway 1, the CPU 31 performs the routine shown in the flow chart of FIG. 12. After performing initialization at first step S81, the CPU 31 determines in step S82 whether a file read command has been received from the home gateway 1. If no file read command is received, then the routine goes to step S83 and the CPU 31 performs other processes.

In the case where it is determined in step S82 that a file read command has been received, the routine goes to step S84. In step S84, the CPU 31 determines whether the digital video tape recorder 3 is now available for reading the file. If the digital video tape recorder 3 is not available for reading the file, the routine goes to step S85. In step S85, the CPU 31 transmits a massage via the communication controller 33 to the home gateway 1 to tell that the digital video tape recorder 3 is not available for reading the file.

On the other hand, if it is determined in step S84 that the digital video tape recorder 3 is now available for reading the file, the routine goes to step S86. In step S86, under the control of the CPU 31, the data recording/reproducing unit 34 makes preparations for reading the file. Then in step S87, the CPU 31 sends a message via the communication controller 33 to the home gateway 1 to tell that the preparations are completed.

In step S88, under the control of the CPU 31, the data recording/reproducing unit 34 reproduces the file from the cassette tape loaded on the data recording/reproducing unit 34. The communication controller 33 transfers the reproduced file to the home gateway 1 via the home bus 5. The data transferred to the home gateway 1 in the above-described manner is then transferred for example to the analog video tape recorder 2 and recorded thereon.

In step S89, the CPU 31 determines whether the file transmission is completed. If the file transmission is not completed yet, then the routine return to step S88 and continues the file transmission process.

If it is determined in step S89 that the file transmission is completed, the routine goes to step S90; in which the CPU 31 informs the home gateway 1 of the completion of the file transmission. Then in step S83, the CPU 31 performs other processes.

Figure 13:
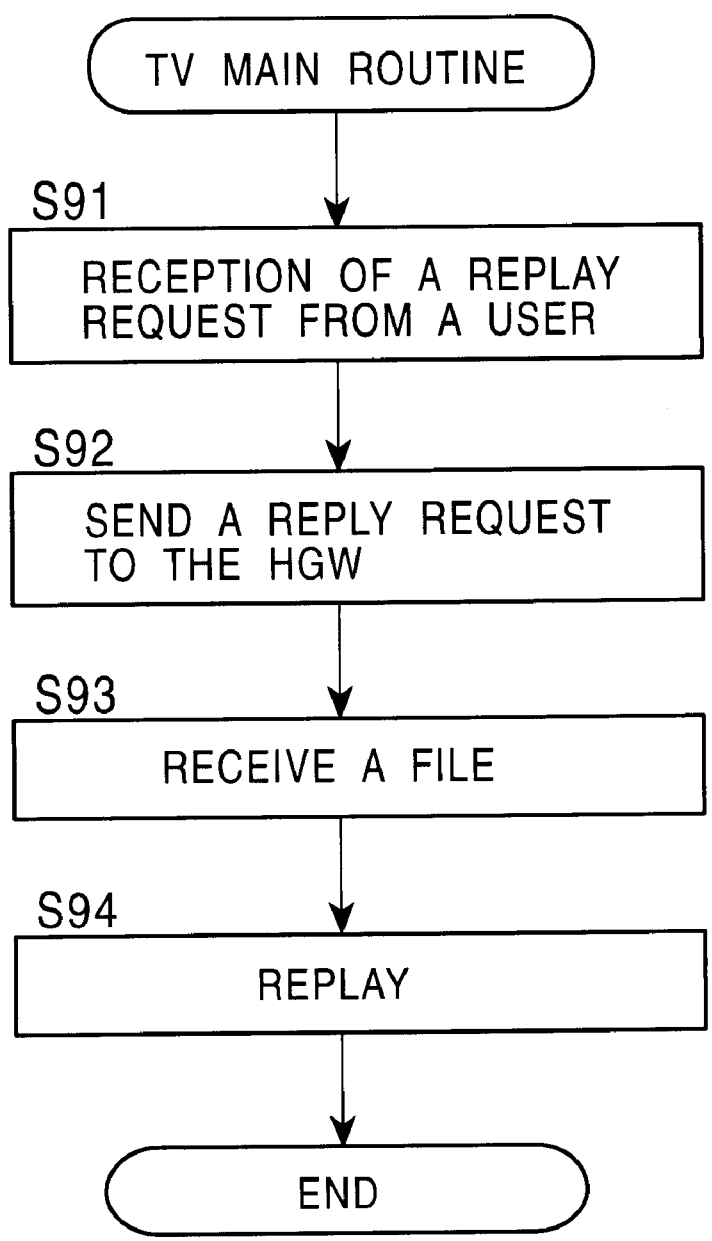
FIG. 13 is a flow chart illustrating the operation of a television set.
Figure 14:
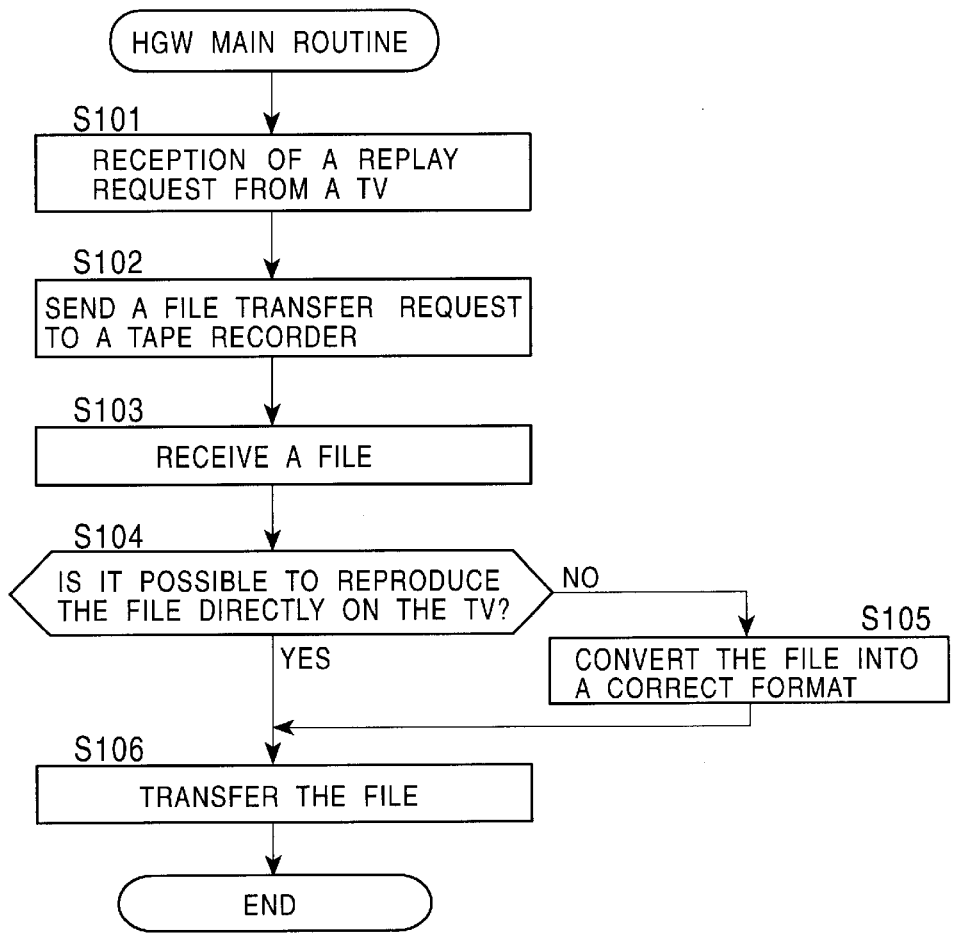
FIG. 14 is a flow chart illustrating the operation of the home gateway.
Figure 15:
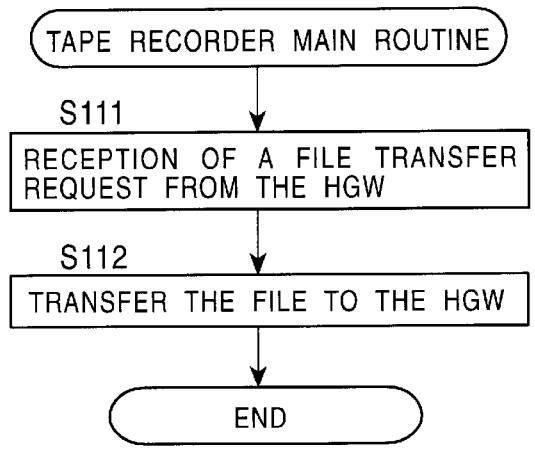
FIG. 15 is a flow chart illustrating the operation of the video tape recorder.

The flow charts shown in FIGS. 13 to 15 represent the operation performed when the televison set 4 requests the digital video tape recorder 3 to reproduce a video file. In this operation, the processes performed by the televison set 4, the home gateway 1, and the digital video tape recorder 3 are shown in FIGS. 13, 14, and 15, respectively.

In step S91 in FIG. 13, if a user operates the input device 45 such as a remote commander of the television set 4 thereby issuing a command to reproduce a file from the digital video tape recorder 3, then the CPU 41, in the following step S92, outputs a corresponding request to the home gateway 1 via the communication controller 44.

In step S101 in FIG. 14, if the CPU 21 of the home gateway 1 receives the request from the television set 4 via the communication controller 26 and further via the home bus 5, then the CPU 21, in the following step S102, sends a file transfer request to the digital video tape recorder 3.

In step S111 in FIG. 15, the CPU 31 of the digital vide tape recorder,3 receives the file transfer request via the home bus 5 and further via the communication, controller 33. In response to this request, in step S112, the data recording/reproducing unit 34 reproduces the file under the control of the CPU 31. The reproduced file is transferred to the home gateway 1 via the communication controller 33 and further via the home bus 5.

If the home gateway 1 receives, in step S103 in FIG. 14, the file transferred from the digital video tape recorder 3, then in step S104 the CPU 21 of the home gateway 1 determines whether the file is of the type which can be reproduced directly on the television set 4. If the file is not of the type which can be reproduced directly on the television set 4, then the routine goes to step S105. In step S105, the CPU 21 converts the file into a format which can be reproduced directly on the television set 4. In the case where the file is of the type which can be reproduced directly on the television set 4, step S105 is skipped.

Then in step S106, the CPU 21 transfers the file received from the digital video tape recorder 3 to the television set 4 via the communication controller and further via the home bus 5.

In step S93 in FIG. 13, the CPU 41 of the television set 4 receives this file via the communication controller 4. Then in step S94, the CPU 41 outputs the file to the display 43, which in turn displays the file on its screen.

Figure 16:
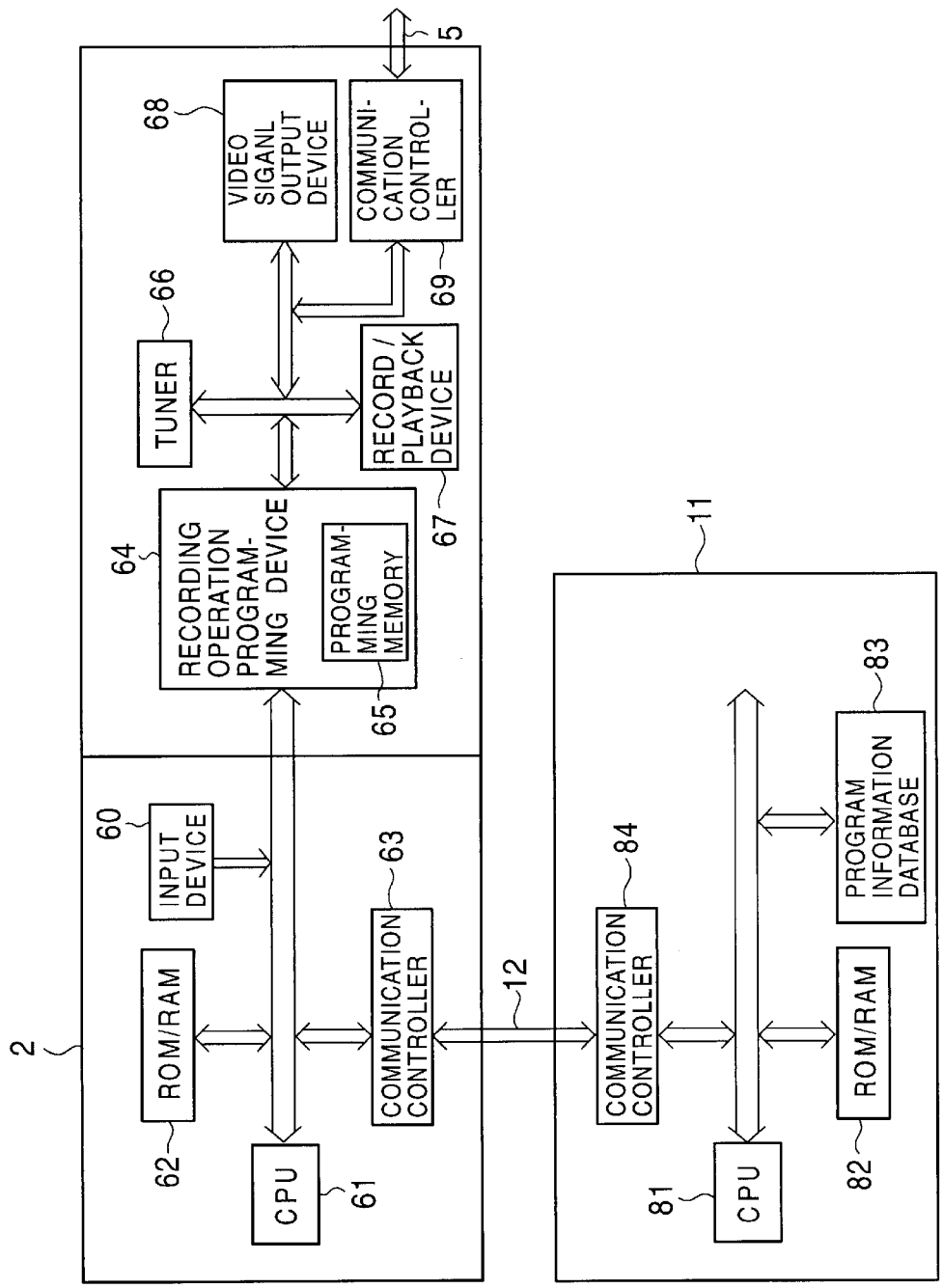
FIG. 16 is a block diagram illustrating an example of the internal construction of the video tape recorder and a server.

FIG. 16 illustrates an example of the construction of the video tape recorder 2 and the server 11. The video tape recorder 2 has a CPU 61 which executes various processes in accordance with a program stored in the ROM of the memory 62. Various data required for the CPU 61 to perform various processes are stored in the RAM of the memory 62. The input device 60 outputs a signal corresponding to the operation performed by the user to the CPU 61. The communication controller 63 communicates with the server 11 via the telephone line 12.

Under the control of the CPU 61, the recording operation programming device 64 performs the operation associated with the programming of TV programs. The programming data is stored in the programming memory 65. The tuner 66 receives a TV electromagnetic wave via an antenna (not shown). The received signal is output to the recording/reproducing unit 67 or the video signal output device 68. The communication controller 69 communicates with other audio/video devices via the home bus 5.

The server 11 has a CPU 81 for executing various processes. The CPU 81 executes various processes according to the program stored in the ROM of the memory 82. Various data required for the CPU 81 to execute various processes are stored in the RAM of the memory 82. The program information database 83 includes EPG data. If the broadcasting time is changed, the EPG data is updated by the CPU 81. The communication controller 84 communicates with electronic devices (the video tape recorder 2 in the example shown in FIG. 16) located in the respective homes via the telephone line 12. Instead of communicating with each electronic device individually via the telephone line 12, the communication may be performed via the home gateway 1.

Figure 17:
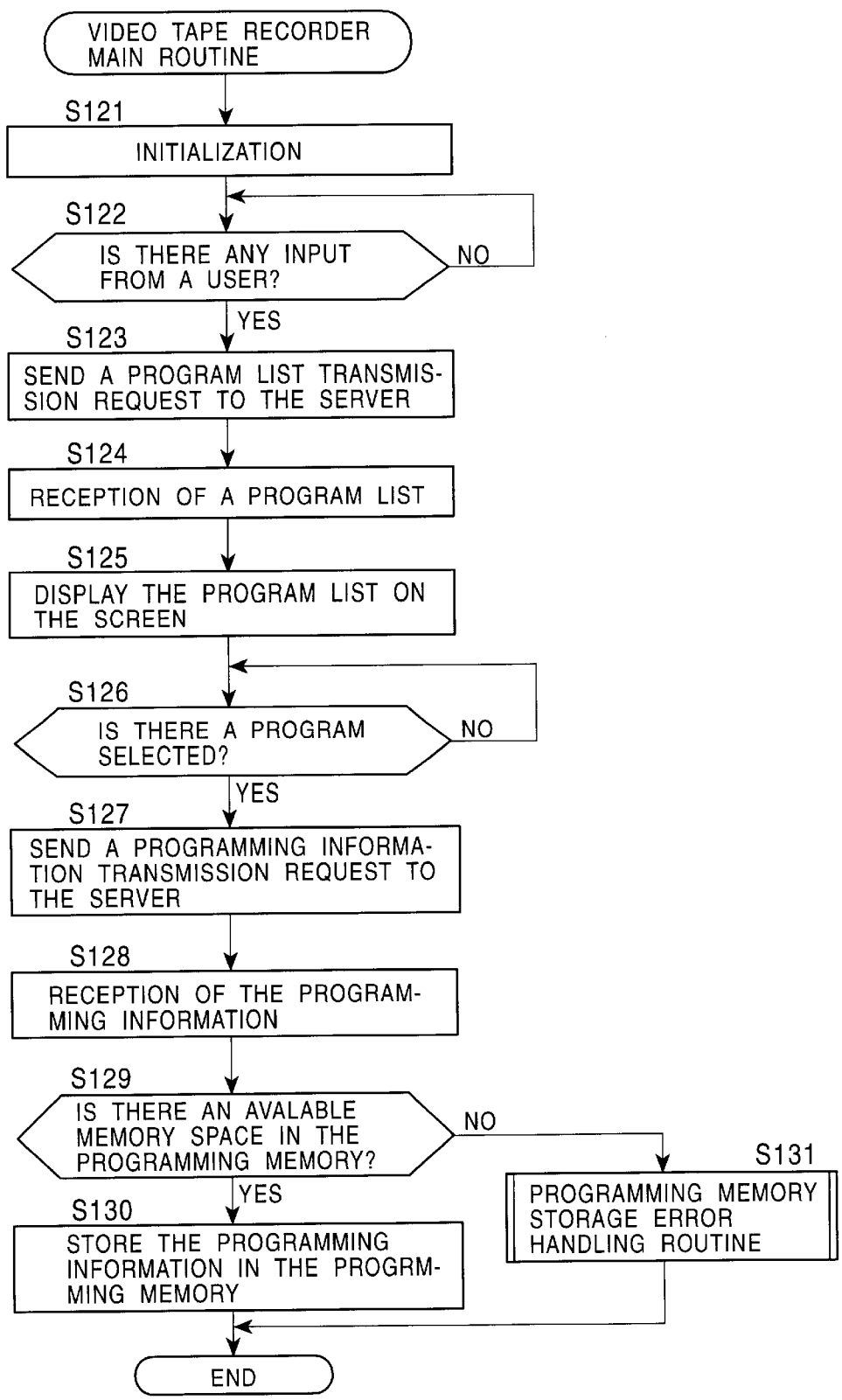
FIG. 17 is a flow chart illustrating the operation of setting the video tape recorder to be programmed to record a desired TV program.
Figure 18:
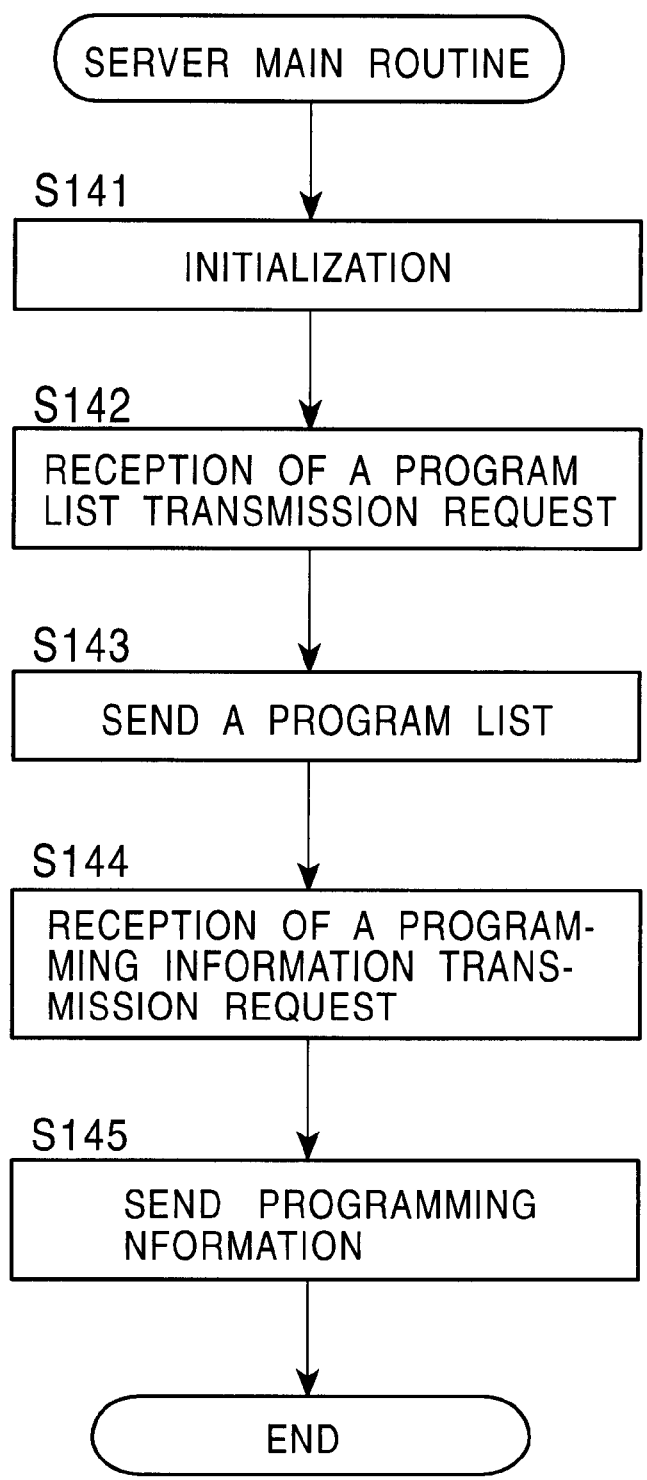
FIG. 18 is a flow chart illustrating the operation performed in the server during the programming process.

Referring to the flow charts shown in FIGS. 17 and 18, the operation of setting the video tape recorder 2 to be programmed to record a desired TV program. In this operation, the process performed in the video tape recorder 2 is shown in FIG. 17 and the process performed in the server 11 is shown in FIG. 18.

At step S121 shown in FIG. 17, the CPU 61 of the video tape recorder 2 performs initialization. After that, the CPU 61 waits in step S122 until a user inputs some command via the input device 60.

If the user issues for example a programming command via the input device, then the routine goes to step S123. In step S123, the CPU 61 sends a message to the server 11 to request it to transfer an electric program guide (EPG) data. More specifically, the message requesting the transmission of the EPG data is sent, under the control of the CPU 61, by the communication controller 63 to the server 11 via the telephone line 12.

At step S141 in FIG. 18, the CPU 81 of the server 11 performs initialization. After that, in step S142, the CPU 81 receives the EPG transmission request transmitted from the video tape recorder. Then in step S143, under the control of the CPU 81, the program information database 83 reproduces the EPG data stored therein, and transmits it to the video tape recorder 2 via the communication controller 84 and further via the telephone line 12.

At step S124 in FIG. 17, the CPU 61 of the video tape recorder 2 receives this EPG data via the communication controller 63. Then in step S125, the CPU 61 transfers the EPG data to the recording operation programming device 64. The EPG data is stored in the programming memory 65. Furthermore, under the control of the CPU 61, the communication controller 69 transmits the EPG data to the television set 4 via the home bus 5.

If the CPU 41 of the television set 4 receives the EPG data via the communication controller 44, the CPU 41 transfers the EPG data to the display 43, which in turn displays it on the screen. Thus, the TV program list is displayed on the screen as shown in FIG. 19.

In the specific example shown in FIG. 19, TV programs in the category of travels are shown in the list. It is difficult to select a desired TV program from as many TV programs as about 100 channels. To avoid this problem, the user may register desired categories via the input device so that only the information about TV programs in these categories is received. In the case where such categories are registered, the CPU 61, in step S123, requests the server 11 to transmit EPG data so that only the information about TV programs in the registered categories is transmitted. This makes it easier for the user to select programs.

FIG. 20 shows an example of EPG registration made on the program information database 83. Of various programs in the category of travel shown in FIG. 19, the EPG data on the program titled "HISTORICAL HERITAGE OVER THE WORLD" is shown in the specific example in FIG. 20. In FIG. 20, the category of "TRAVEL, OVERSEAS, HISTORY" is specified by the user, and thus EPG data in this category is transmitted to the user.

The 10-digit number (1234567890) on the left side is the ID number of the program. The 20-digit number (19970101120013000105) following that represents the date (Jan. 1, 1997) on which the program is to be broadcasted, the starting time (12:00), the ending time (13:00), the channel number (01), and the type of the TV program (05).

In the next step S126 in FIG. 17, the CPU 16 of the video tape recorder waits for a program to be selected. For example, when a program list is displayed as shown in FIG. 19, the user may select a desired program by operating the input device 60 so that the cursor (denoted by the arrow in FIG. 19) is moved to the desired position thereby pointing to it, and then pressing a decision button.

If it is determined in step S126 that a particular program has been selected, the routine goes to step S127. In step S127, the CPU 61 of the video tape recorder 2 requests the server 11 to transmit the programming information associated with the selected TV program. When the server 11 transmits the EPG data in the previous step S143, the server 11 does not transmit the programming information represented by the 20-digit number of the EPG data shown in FIG. 20. Thus, in step S127, the CPU 61 of the video tape recorder 2 requests the server 11 to transmit the programming information represented by the 20-digit number shown in FIG. 20. Alternatively, the server 11 may transmit all information including the 20-digit programming information in step S143. In this case, step S127 is no longer necessary.

If the CPU 81 of the server 11 receives the EPG data transmission request in step S144 in FIG. 18, then in the following step S145 the CPU 81 retrieves the EPG data from the program information database 83 and transmits it to the video tape recorder 2 via the communication controller 84.

Figure 21:
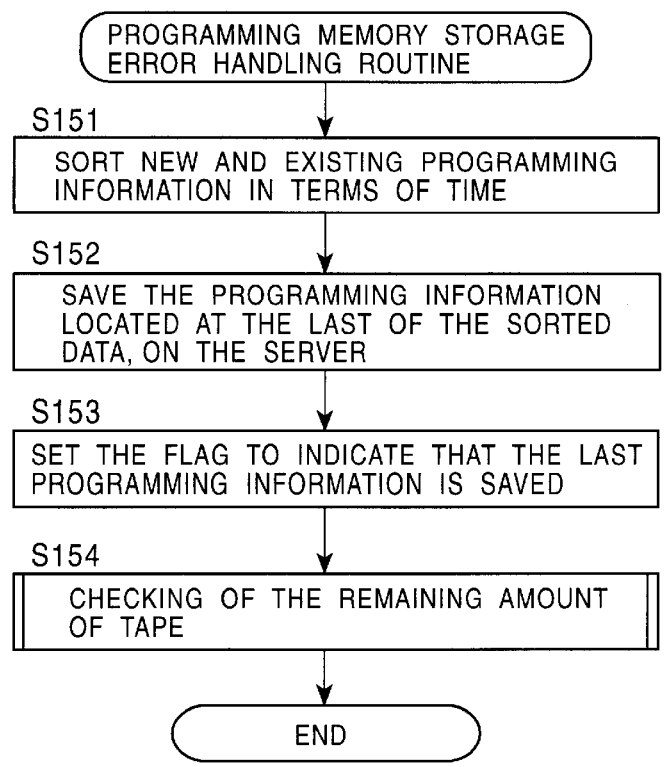
FIG. 21 is a flow chart illustrating the details of the programming memory storage error handling routine at step S131 in FIG. 17.

Thus, in step S128 in FIG. 17, the CPU 61 of the video tape recorder 2 receives the EPG data transmitted from the server 11. In step S129, the CPU 61 determines whether the programming memory 65 has an available memory space. If there is an available memory space, then in step S130 the CPU 61 stores the EPG data received in step S128 into the programming memory 65. On the other hand, if it is determined in step S129 that the programming memory 65 has no available memory space, the routine goes to step S131 to perform a programming memory storage error handling routine as described in detail in the flow chart of FIG. 21.

At the first step S151 in the programming memory storage error handling routine, the CPU 61 sorts EPG data including both existing programming data and new programming data received in step S128. Then in step S152, the CPU 61 transfers to the server 11 the programming information located at the last of the series of data sorted in terms of time. If the server 11 receives this programming information, the server. 11 stores it in the RAM of the memory 82 or in the program information database 83.

The programming information associated with TV programs which are later in the starting time is less urgent than that associated with TV programs which are earlier in the starting time. Therefore, when the available memory capacity of the programming memory 65 is not sufficient, the programming information associated with such less urgent TV programs may be saved in the server 11 without encountering any problems in the current operation.

Figure 22:
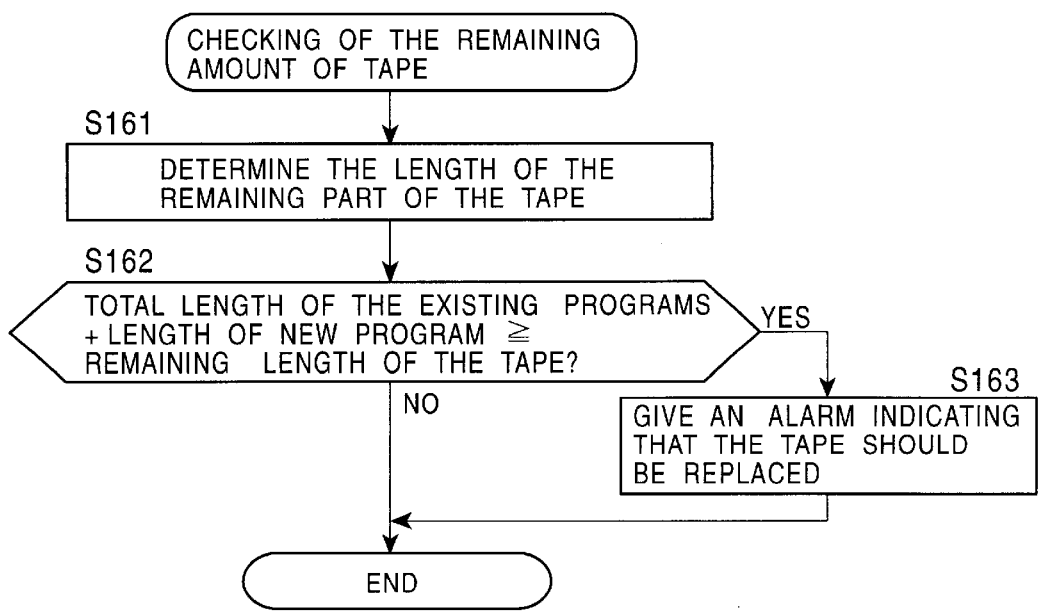
FIG. 22 is a flow chart illustrating the details of the operation of checking the remaining amount of a tape at step S154 in FIG. 21.

After that the routine goes to step S153, and the CPU 61 sets a flag in the programming memory 65 so as to indicate that a part of the programming information is stored in the server 11. Then in step S154, the CPU 61 checks the remaining amount of the magnetic tape loaded on the recording/reproducing unit 67. The process of checking the remaining amount of the tape is described in further detail below with reference to the flow chart shown in FIG. 22.

In step S161, the CPU 61 determines the remaining length of time of the video cassette tape loaded. In step S162, the CPU 61 determines the sum of the length of time of the newly-set TV program and the total length of time of the already-set TV programs, and determines whether the resultant sum is greater than the remaining length of time of the tape detected in step S161. If it is determined that the remaining length of the tape is smaller than the above sum, then the routine goes to step S163. In step S163, the CPU 61 generates a message telling that the tape should be replaced. The message is output to the televison set 4 and displayed on the screen of the display 43. The user can perform required replacement of the magnetic tape loaded on the video tape recorder 2 according to the message. On the other hand, if it is determined in step S162 that the remaining length of the tape is sufficient, step S163 is skipped.

When the programming information has been set as described above, the programming memory 65 includes information about TV programs to be recorded. If the user issues a programming confirmation command via the input device 60, the CPU 61 reads the programming information from the programming memory 65 and transmits it to the television set 4 so that it is displayed on its screen. FIG. 23 illustrates an example of the programming information displayed on the screen. As shown, the titles of programs and brief descriptions thereof are displayed.

Figure 24:
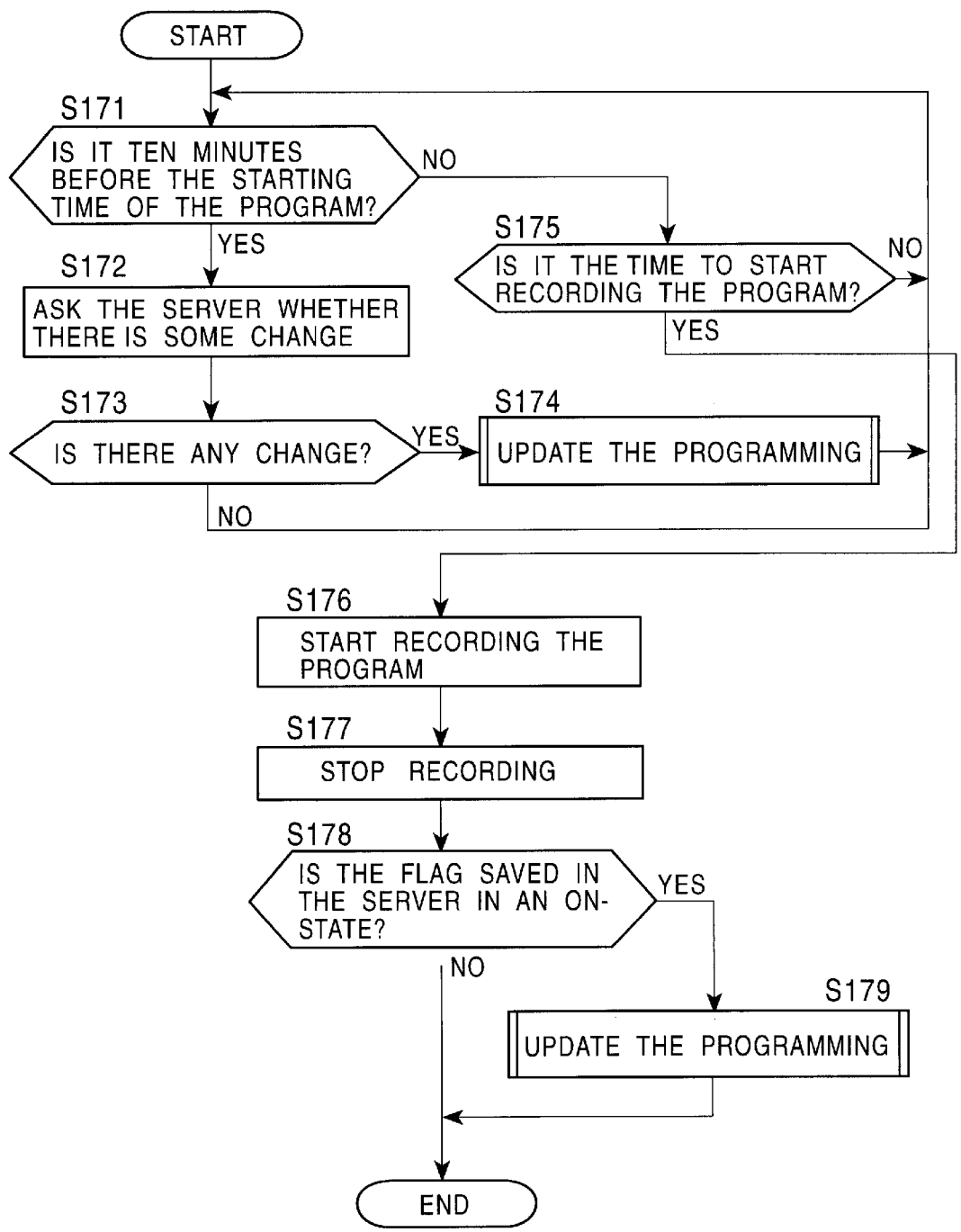
FIG. 24 is a flow chart illustrating the recording operation performed in the video tape recorder.

When the recording operation has been programmed in the above-described manner, the CPU 61 of the video tape recorder 2 performs the recording operation according to the programmed steps as shown in the flow chart of FIG. 24. The CPU 61 always watches the time measured by an internal clock. In step S171, the CPU 61 determines whether the time is 10 min before the starting time of the earliest program of all stored in the programming memory 65. The length of time (10 min in the above example) before the program starting time may be selected to an arbitrary value by the user via the input device 60. If it is determined in step S171 that the time is now 10 min before the starting time of the program, then the routine goes to step S172. The CPU 61 asks the server 11 whether there is some change in the broadcasting date or time of the program. As described above, the server 11 maintains the program information database 83 in an updated state. In response to the inquiry from the video tape recorder 2, the CPU 81 of the server 11 outputs a signal to the video tape recorder 2 which indicates whether something is changed in the information stored in the program information database 83.

Figure 25:
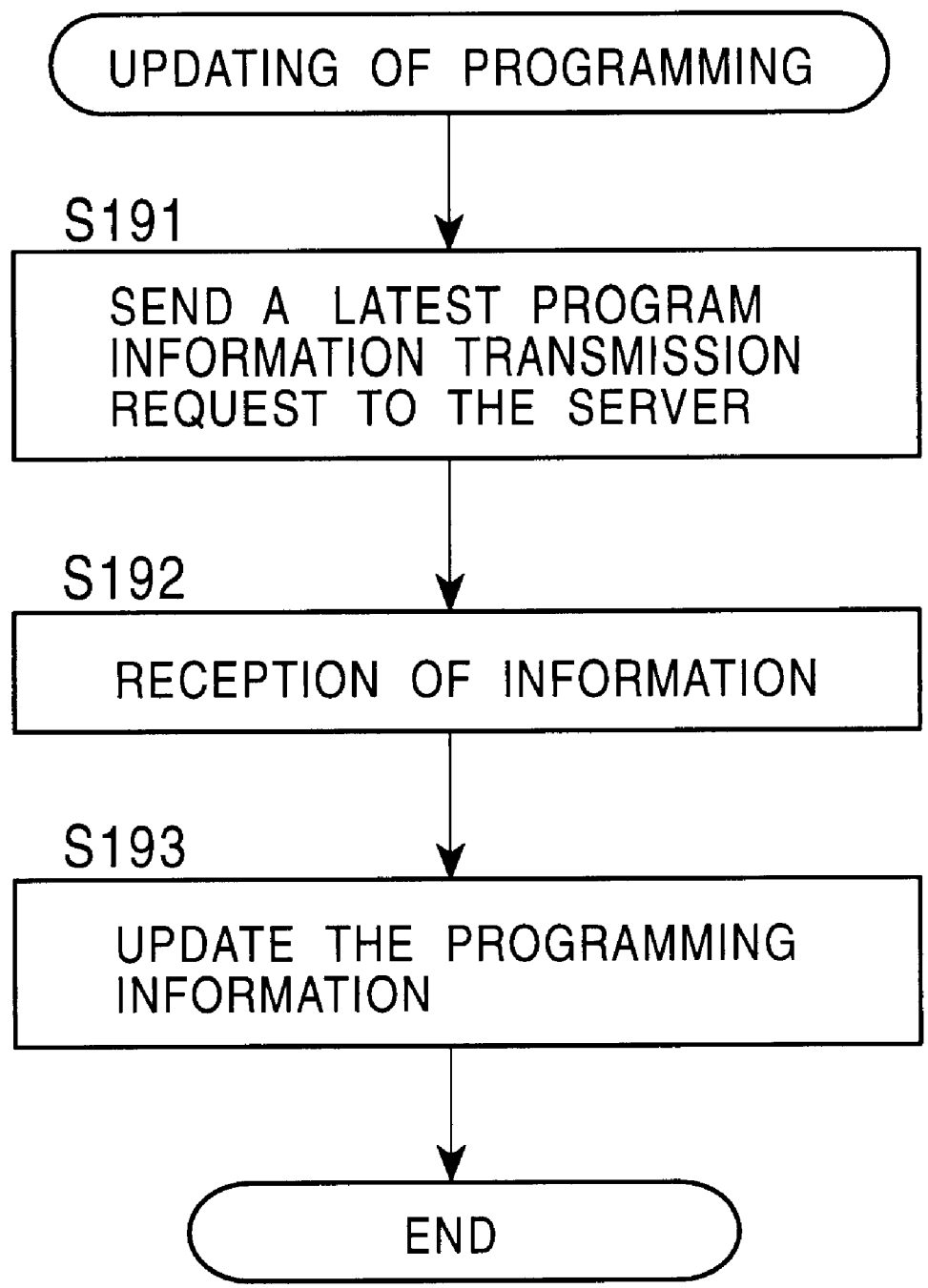
FIG. 25 is a flow chart illustrating the details of the operation of updating the programming information at step S174 in FIG. 24.

If the CPU 61 of the video tape recorder 2 receives this signal from the server 11, the CPU 61 determines in step S173 whether there is a change in the date or time of the program. If there is a change, then the routine goes to step S174 to perform a programming information updating routine. The programming information updating routine is described in further detail below with reference to FIG. 25.

At step S191 in this routine, the CPU 61 requests the server 11 to send updated programming information. In response to this request, the server 11 reads the programming information from the program information database 83, and sends it to the video tape recorder 2. Thus in step S192, the CPU 61 of the video tape recorder receives this programming information. Then in step S193, the CPU 61 replaces the programming information stored in the programming memory 65 with the received information thereby updating it.

On the other hand, if it is determined in step S173 that there is no change in the programming information, then the routine returns to step S171.

In the case where it is determined in step S171 that the time has not come to the time 10 min before the recording starting time, the routine goes to step S175 in which it is determined whether the recording starting time has come. If the recording starting time has not come yet, the routine returns to step S171 and the above-described process is performed repeatedly.

If it is determined in step S175 that the recording starting time has come, the routine goes to step S176. In step S176, under the control of the CPU 61, the recording/reproducing unit 67 starts the recording operation. In this process, the recording/reproducing unit 64 controls the tuner 66 so that the tuner 66 receives the channel programmed to be recorded and the received signal is transmitted to the recording/reproducing unit 67 and recorded in the recording/reproducing unit 64. Then in step S177 if it is determined that the broadcast ending time has come, the recording operation is stopped.

In step S178, the CPU 61 determines whether the flag in the programming memory 65 indicates that a part of the programming information is saved in the server 11. If it is determined that a part of the programming information is saved in the server 11, then the routine goes to step S179. In step S179, the CPU 61 performs the programming information updating routine. Also in this case, the CPU 61 requests the server 11 to send the programming information associated with the TV program to be recorded. The programming information received is stored in the programming memory 65. Thus, the programming information temporarily saved in the server 11 is now stored in the programming memory 65.

If it is determined in step S178 that no programming information is saved in the server 11, then step S179 is skipped.

FIG. 26 summarizes the timing of the programming process. If an EPG data transmission request is sent from the video tape recorder 2 to the server 11 at time t1, then the server 11 sends the EPG data to the video tape recorder 2 at time t2. In this process, as described above, the server 11 may send only the EPG data associated with a particular category such as travel or history as required.

At the receiving end where the video tape recorder 2 is located, the received EPG data is displayed on the televison set 4. At time t3, the selection of TV programs to be recorded is performed. At time t4 after selecting the TV programs, the programming information is stored in the video tape recorder 2. However, if all the programming information cannot be stored in the programming memory, then a part of the programming information may be transferred to the server 11 so as to save it therein, as described above.

At time t6, if it has come to the time 10 min before the broadcast starting time, the video tape recorder 2 asks the server 11 whether this has been changed in the programing information associated with the TV program to be recorded. In response to this inquiry from the video tape recorder 2, the server 11 informs it, at time t7, whether there is some change in the programming information. If there is no change in the programming information, the video tape recorder 2 starts the recording operation when the broadcast starting time has come.

On the other hand, if at time t8 the server 11 sends a message to the video tape recorder 2 which tells that something is changed in the programming information, then the video tape recorder 2 requests the server 11 to send the updated programming information. The video tape recorder 2 updates the programming information in accordance with the information received from the server 11. When the broadcasting time has come, the video tape recorder 2 starts the recording operation.

What is claimed is:

1. An electronic device for recording TV programs, comprising:

a storage unit operable to store control information used to control the recording of TV programs;

a processor operable to perform a predetermined recording process in accordance with said control information stored in said storage unit to record one or more programs specified by said control information;

a judgment device operable to determine an available control information storage capacity of said storage unit; and a transmitter operable to transfer said control information via a communication line to a shared TV program data server remote from said electronic device so as to store, in said TV program data server, one or more portions of said control information based on TV program recording times of said one or more portions and depending on said available control information storage capacity of said storage unit.

2. An electronic device according to claim 1, further comprising a requesting device operable to request said TV program data server to transfer said control information back to said processor when said processor has performed said predetermined recording process.

3. An electronic device according to claim 2, wherein said storage unit stores said control information that said TV program data server has transferred in response to the request by said requesting device.

4. An electronic device according to claim 1, further comprising:

a receiver operable to receive selection information associated with said control information.

5. An electronic device according to claim 4, wherein said selection information is information about a TV program schedule.

6. An electronic device according to claim 5, wherein said selection information is information about a TV program schedule within a particular category registered in advance.

7. An electronic device according to claim 1, wherein said control information comprises information about the times at which said processor starts and ends said predetermined recording process.

8. An electronic device according to claim 7, wherein said control information is information about the time at which said processor starts the recording of TV programs transmitted by said TV program data device.

9. A method of controlling an electronic device for recording TV programs, comprising:

storing in a storage unit control information for controlling the electronic device to control the recording of TV programs;

performing a predetermined recording process in accordance with the stored control information to record one or more programs specified by said control information;

determining an available control information storage capacity of the storage unit;

transferring the control information to a TV program data server so as to store, in said TV program data server, one or more portions of said control information based on TV program recording times of said one or more portions and depending on the available control information storage capacity of the storage unit; and receiving a request from a requesting device to transfer the control information back to the electronic device when the predetermined recording process has been performed.

10. A control apparatus for controlling a plurality of electronic devices for recording TV programs in accordance with control information used to control the recording of TV programs, said electronic devices being connected via communication lines to said control apparatus, said apparatus comprising:

a judgment device operable to determine an available control information storage capacity of each of said plurality of electronic devices;

a receiver operable to receive one or more portions of said control information transmitted by each of said plurality of electronic devices based upon the determination made by said judgment device and on TV program recording times of said one or more portions;

a storage unit operable to store said one or more portions of said control information received by said receiver; and a transmitter operable to transfer said one or more portions of said control information from said storage unit to each of said plurality of electronic devices in response to a request from each of said plurality of electronic devices.

11. An electronic device control system, comprising:

an electronic device for recording TV programs including:

a first storage unit operable to store control information used to control the recording of TV programs;

a processor operable to perform a predetermined recording process in accordance with said control information stored in said first storage unit to record one or more programs specified by said control information;

a judgment device operable to determine an available control information storage capacity of said first storage unit;

a first transmitter operable to transfer said control information to an information processing apparatus so as to store in said information processing apparatus one or more portions of said control information based on TV program recording times of said one or more portions and depending on said available control information storage capacity of said first storage unit; and a requesting device operable to request said information processing apparatus to transfer said control information back to said electronic device;

wherein said information processing apparatus includes:

a receiver operable to receive said one or more portions of said control information from said electronic device;

a second storage unit operable to store said one or more portions of said control information received by said receiver; and a second transmitter operable to transfer said one or more portions of said control information from said second storage unit to said electronic device in response to a request from said requesting device.

12. A method of controlling an electronic device control system including an electronic device for recording TV programs and an information processing apparatus connected to each other via a communication line, comprising:

storing control information used to control the recording of TV programs in a first storage unit in the electronic device;

performing a predetermined recording process in accordance with the stored control information to record one or more programs specified by said control information;

determining an available control information storage capacity of the first storage unit;

transferring the control information to the information processing apparatus for storage based on TV program recording times of said one or more portions and depending on the available control information storage capacity of the first storage unit;

storing the control information in a second storage unit in the information processing apparatus;

receiving a request from a requesting device in the electronic device to transmit the stored control information; and transmitting the stored control information from the second storage unit to the electronic device in response to the request from the requesting device.

13. An information supplying system for supplying updated TV programming information to an external apparatus, comprising:

an external apparatus including a storage unit operable to store selection information used to select desired programming information from a plurality of pieces of information; and an updating device operable to update said selection information stored in said storage unit when said selection information is changed; and a remote server including a transmitter operable to transmit said updated selection information via a communication line to said external apparatus in response to a request received from said external apparatus.

14. A method of supplying updated TV programming information, comprising:

storing selection information used to select desired programming information from a plurality of pieces of information;

updating the stored selection information when the selection information is changed; and transmitting the updated selection information in response to a request received from an external apparatus.

15. An information supplying system, comprising:

an information supplying apparatus; and an electronic device connected to said information supplying apparatus by a communication line, said electronic device including:

a receiver operable to receive control information from said information supplying apparatus, said control information being used to select desired information from a plurality of pieces of information;

a first storage unit operable to store said selected information and a first time corresponding to said selected information received by said receiver;

a judgment device operable to determine an available storage capacity of said first storage unit;

a detection device operable to detect a second time which is earlier by a predetermined length of time than said first time;

a confirmation device operable to confirm a change in said selected information when said detection device detects the arrival of said second time;

a first updating unit operable to update said selected information stored in said first storage unit when said confirmation device detects a change in said selected information; and a requesting device operable to request said information supplying apparatus to transmit data to said electronic device; and said information supplying apparatus including:

a second storage unit operable to store said selected information based upon said available storage capacity of said first storage unit;

a second updating unit operable to update said selected information stored in said second storage unit when said selected information is changed; and a transmitter operable to transmit said updated selected information in response to a request received from said requesting device.

16. A method of supplying information in an information supplying system comprising an electronic device and an information supplying apparatus connected to each other via a communication line, comprising:

determining an available storage capacity of the electronic device;

transmitting control information from the information supplying apparatus to the electronic device if the available storage capacity of the electronic device is adequate, the control information being used to select desired information from a plurality of pieces of information;

storing the selected information and a first time corresponding to the selected information transmitted to the electronic device;

detecting a second time which is earlier by a predetermined length of time than the first time;

confirming whether there is a change in the selected information when said detection step detects the arrival of the second time;

updating the stored selected information when a change in the selected information is detected;

storing the selected information in a second storage unit in the information supplying apparatus if the available storage capacity of the electronic device is not adequate;

updating the selected information stored in the second storage unit when the elected information is changed;

receiving a request from a requesting device in the electronic device to transmit the updated selected information; and transmitting the updated selected information in response to the request received from the electronic device.

17. An electronic device for recording TV programs, comprising:

a storage unit operable to store control information used to control the recording of TV programs;

a processor operable to perform a predetermined recording process in accordance with said control information stored in said storage unit to record one or more programs specified by said control information;

a judgment device operable to determine an available control information storage capacity of said storage unit;

a transmitter operable to transfer said control information to an external device so as to store in said external device one or more portions of said control information based on TV program recording times of said one or more portions and depending on said available control information storage capacity of said storage unit; and a requesting device operable to request said external device to transfer said control information back to said processor when said processor has performed said predetermined recording process.

18. An electronic device according to claim 17, wherein said storage unit stores said control information that said external device has transferred in response to the request by said requesting device.

19. An electronic device according to claim 17, further comprising:

a receiver operable to receive selection information associated with said control information.

20. An electronic device according to claim 19, wherein said selection information is information about a TV program schedule.

21. An electronic device according to claim 20, wherein said selection information is information about a TV program schedule within a particular category registered in advance.

22. An electronic device according to claim 17, wherein said control information comprises information about the times at which said processor starts and ends said predetermined recording process.

23. An electronic device according to claim 22, wherein said control information is information about the time at which said processor starts the recording of TV programs transmitted by said external device.

24. An information supplying system, comprising:

an external device; and a plurality of electronic devices each linked to said external device via a communication path, each of said plurality of electronic devices including:

a storage unit operable to store control information used to control the recording of TV programs;

a processor operable to perform a predetermined recording process in accordance with said control information stored in said storage unit to record one or more programs specified by said control information;

a judgment device operable to determine an available control information storage capacity of said storage unit; and a transmitter operable to transmit said control information to said external device so as to store one or more portions of said control information in said external device based on TV program recording times of said one or more portions and depending on said available control information storage capacity of said storage unit.

* * * * *

UNITED STATES PATENT AND TRADEMARK OFFICE
CERTIFICATE OF CORRECTION

PATENT NO. : 6,678,462 B1
DATED : January 13, 2004
INVENTOR(S) : Shuichi Chihara It is certified that error appears in the above-identified patent and that said Letters Patent is hereby corrected as shown below:

Column 1,
Line 20, "data" should read -- date --.

Column 5,
Line 42, after "device 43" insert -- is --.

Column 6,
Line 29, delete "an" (second occurrence).

Column 8,
Line 57, "massage" should read -- message --.

Column 9,
Line 11, "return" should read -- returns --.

Column 10,
Line 32, after "program" insert -- is discussed --.

Column 14,
Line 62, "device" should read -- server --.

Signed and Sealed this

Twenty-second Day of June, 2004

JON W. DUDAS
*Acting Director of the United States Patent and Trademark Office*